United States Patent
Nester et al.

(10) Patent No.: US 12,018,836 B2
(45) Date of Patent: Jun. 25, 2024

(54) ANALOG VALVE ACTUATOR, PROGRAMMABLE CONTROLLER, ALARM SYSTEM, AND METHODS FOR THEIR COMBINED USE

(71) Applicant: Nestec, Inc., Ocean Township, NJ (US)

(72) Inventors: Jim Nester, Telford, PA (US); Rick Reimlinger, Manasquan, NJ (US); Jack Clark, Asbury, NJ (US); Frank DeSantis, Bayonne, NJ (US)

(73) Assignee: Nestec, Inc., Ocean Township, NJ (US)

( * ) Notice: Subject to any disclaimer, the term of this patent is extended or adjusted under 35 U.S.C. 154(b) by 144 days.

(21) Appl. No.: 16/903,388

(22) Filed: Jun. 17, 2020

(65) Prior Publication Data
US 2021/0071866 A1     Mar. 11, 2021

Related U.S. Application Data

(60) Provisional application No. 62/863,161, filed on Jun. 18, 2019, provisional application No. 62/862,557, filed on Jun. 17, 2019.

(51) Int. Cl.
*F23G 7/06* (2006.01)
*F24D 19/00* (2006.01)
(Continued)

(52) U.S. Cl.
CPC ............. *F23G 7/068* (2013.01); *F24D 19/00* (2013.01); *F27D 7/02* (2013.01); *F27D 17/004* (2013.01);
(Continued)

(58) Field of Classification Search
CPC .............. F15B 19/005; F15B 20/008; F15B 2211/8755; F16K 11/044; F16K 31/046;
(Continued)

(56) References Cited

U.S. PATENT DOCUMENTS 1,556,811 A * 10/1925 Turner ................... F23L 15/02
137/309
4,816,987 A * 3/1989 Brooks ................ F16K 31/046
137/487.5

(Continued)

FOREIGN PATENT DOCUMENTS

WO     WO-9742439 A1 * 11/1997 ............ F16K 11/044

OTHER PUBLICATIONS

John Mendolia, Choosing servomotor brakes, Machine Design, Aug. 2000. https://www.machinedesign.com/automation-iiot/article/21826149/choosing-servomotor-brakes (Year: 2000).*

*Primary Examiner* — Ko-Wei Lin
(74) *Attorney, Agent, or Firm* — Muskin and Farmer LLC

(57) ABSTRACT

An electrically controlled valve which can be operated using a programable controller. A cooperating pair of the electrically controlled valves can be used in a Regenerative Thermal Oxidizer (RTO). The electrically controlled valve has two seats, and a blade which can move between a first position contacting the first seat and a second position contacting the second seat. The blade is moved by an actuator which is controlled by a variable frequency drive (VFD). A control computer continuously monitors the operation of both valves and halts operation of the system upon detecting a fault (error). The motion of the blade is programmed such that force of impact on the seat is reduced. Once the blade is seated, a brake is engaged which maintains the stationary position while utilizing relatively low power.

26 Claims, 23 Drawing Sheets

(51) Int. Cl.
    *F27D 7/02*          (2006.01)
    *F27D 17/00*       (2006.01)
    *F27D 19/00*       (2006.01)

(52) U.S. Cl.
    CPC .... *F27D 17/008* (2013.01); *F27D 2019/0071* (2013.01)

(58) Field of Classification Search
    CPC ............ F16K 31/0627; F16K 37/0041; F16K 37/0083; F23G 7/068; F27D 7/02; F27D 17/004; F27D 17/008; F27D 2019/0071
    USPC ................ 137/309, 311; 165/4; 251/129.04, 251/129.11, 129.13; 432/180, 181
    See application file for complete search history.

(56) References Cited

U.S. PATENT DOCUMENTS

| | | | |
|---|---|---|---|
| 5,134,945 A * | 8/1992 | Reimlinger | F23G 7/068 110/304 |
| 2006/0102864 A1 * | 5/2006 | Bria | F16K 31/046 251/129.13 |
| 2009/0005914 A1 * | 1/2009 | Demarco | F16H 61/431 700/282 |
| 2010/0196220 A1 * | 8/2010 | Bria | F23G 7/068 422/171 |
| 2016/0160691 A1 * | 6/2016 | Okamura | F16K 31/047 415/146 |

* cited by examiner

FIRST CYCLE - CHAMBER "A" ON INLET & "B" ON OUTLET

NEXT CYCLE - CHAMBER "A" ON OUTLET & "B" ON INLET

REGENERATIVE THERMAL OXIDIZER CROSS SECTION

RETRACTED POSITION - CLOSED

EXTENDED POSITION - CLOSED

RETRACTED POSITION - SEATED

EXTENDED POSITION - SEATED

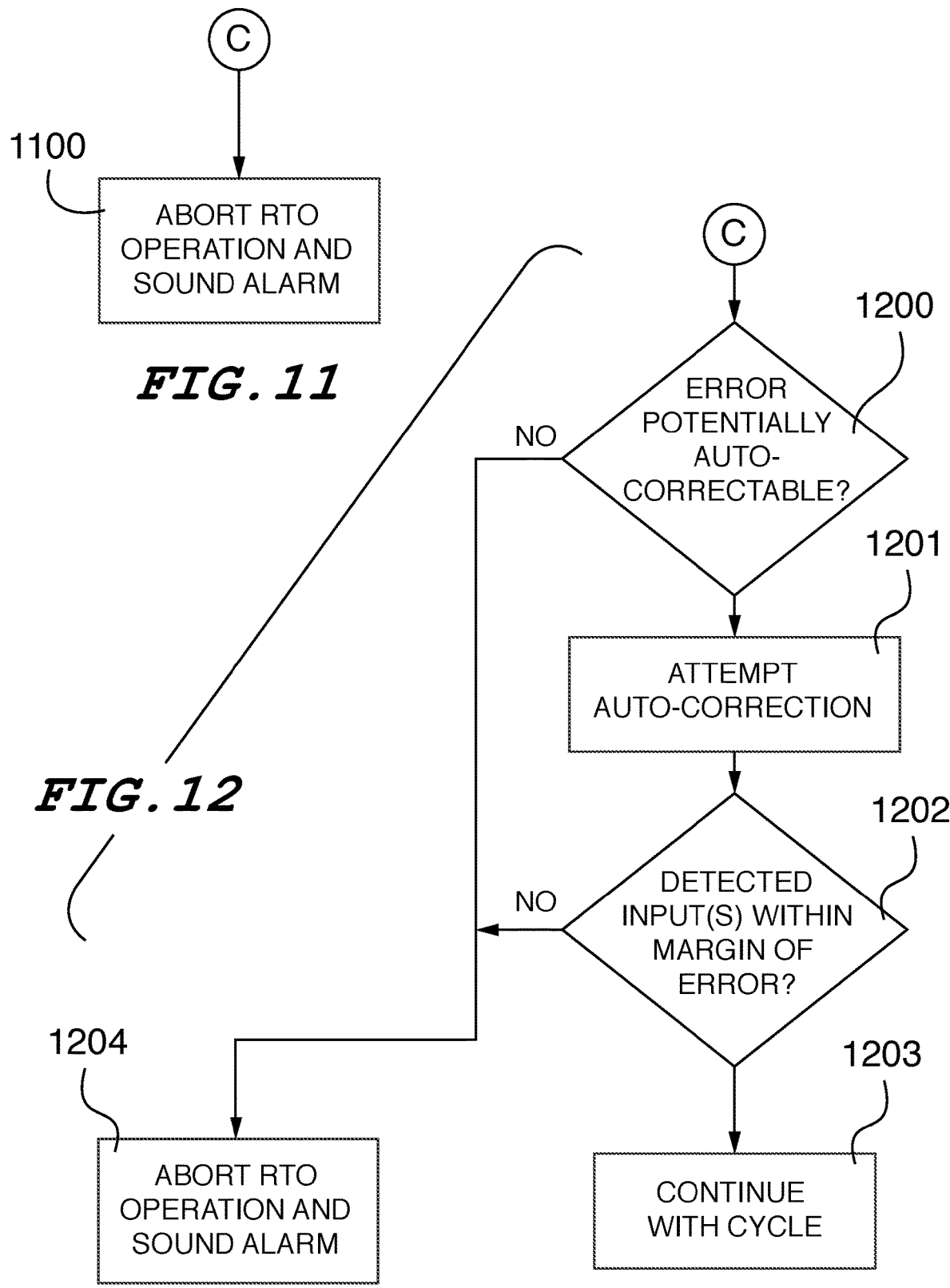

ANALOG VALVE ACTUATOR, PROGRAMMABLE CONTROLLER, ALARM SYSTEM, AND METHODS FOR THEIR COMBINED USE

CROSS REFERENCE TO RELATED APPLICATIONS

This application claims benefit to U.S. provisional applications 62/863,161 and 62/862,557, both of which are incorporated by reference herein in their entireties.

FIELD OF THE INVENTION

The present analog valve actuator is a mechanical device that can be used to efficiently and precisely move a valve from one position to another, and any number of intermediate positions, at variable speeds, by use of a programmable controller and servo drive. Additionally, the actuator and controller can be used in conjunction with an alarm system which can detect errors in the function of the actuator and take corrective action automatically and notify users of error.

BACKGROUND

Although the present valve actuator, programable controller and alarm system can be adapted for use in numerous systems and industries, the present variation was created to control airflow through Regenerative Thermal Oxidizers (RTOs), which are a commonly used anti-pollution device used to clean contaminated air. Use of the present valve actuator, programable controller and alarm system in the context of an RTO system will be discussed henceforth for illustrative purposes. Likewise, although a majority of the description below will be directed to controlling the flow of gases using the present valve actuator, programable controller and alarm system, it should be understood that these devices and their combination are equally suited for use with valves controlling the flow of liquids and solids.

To fully understand the use of the present valve actuator and programable controller within an RTO, one must have a basic understanding of what an RTO is and how it functions. While there are a wide variety of RTO designs (for example see U.S. Pat. Nos. 5,540,584 and 5,262,131, both of which are incorporated by reference herein in their entireties), most of which are customized for a specific purpose, the basic premise is that polluted air is introduced into an RTO in order to be heated to a level sufficient to cause the pollutants to decay or oxidize into carbon dioxide and water, which are far less harmful to human health and the environment than the pollutants themselves would be. The cleaned air may then be cooled before being released back into the environment. In most developed countries, including the U.S., the use of RTOs are required in order to comply with limits set forth in the anti-pollution statutes of each jurisdiction.

RTOs function by directing airflow in a first direction through various blocks of heat exchange media, which are typically ceramic or a similar material. In a first heat exchange block, the polluted air, also referred to a process gas, which can be at an initial temperature of 75-850 degrees Fahrenheit, is heated by the first heat exchange block to temperatures of approximately 1450 to 1950 degrees Fahrenheit before passing into a combustion chamber. In the combustion chamber, the heated process gas is mixed with natural gas and combusted, thus destroying most of the pollutants in the process gas via oxidation. The cleaned process gas then passes through a second heat exchange block wherein it is cooled from approximately 1950 degrees to 100-950 degrees Fahrenheit, before being released as exhaust into the atmosphere. In so doing, the first heat exchange block is cooled while the second heat exchange block is heated. For this reason, a functioning RTO must periodically reverse the flow of the process gas to ensure that it is heated before reaching the combustion chamber and the treated process gas is cooled after leaving the combustion chamber.

One of the typical features of an RTO is that the flow of the process gas can be reversed, often in cycles lasting sixty seconds to four minutes in duration wherein the first heat exchange block can be used for heating the processed air in a first cycle and cooling it in a second cycle while the second heat exchange block correspondingly cools the processed air in the first cycle and heats the processed gas in the second cycle. In fact, the heating of the processed gas, which occurs in the first heat exchange block in the first cycle, is possible because the first heat exchange block was previously heated by passing the combusted processed air through it to cool it during the second cycle. Of course, the same is true of the second heat exchange block, which is heated and cooled at opposite times of the first heat exchange block.

Control of airflow through RTOs is typically performed by using poppet valves or similar devices. Poppet valves have existed for many decades and are typically a disc-shaped blade mounted on the end of a movable shaft. (The valves used to control airflow in internal combustion engines are variations of the poppet valve.) The disc-shaped blade should be of a suitable size and shape to overlap a seat surrounding a port through which air passes in or out of the valve. When the disc-shaped blade is firmly against the seat, with proper seating force, air is not allowed to flow through the port and when the blade (the blade is also referred to as the disc herein) is not against the seat, and no seating force is applied, air is allowed to flow through the port. The seating force required to seal the port with the plug can be between 100 and 5000 or more pounds of pressure. In RTO's these poppet valves can be quite large, measuring in circumference up to seventy-two (72) inches or more.

Presently, in RTOs, these poppet valves are typically actuated using pneumatic cylinders, which use air pressure to quickly move the valves in a binary operation, wherein the valve is either open or closed at A port or B port and the pneumatic cylinder is either extended or retracted. Specifically, when a pneumatic cylinder is filled with pressurized air, a piston within the cylinder is pushed from one side to the other, through a predetermined distance. Therefore, when compressed air is added to the pneumatic cylinder in one direction the valve is moved to A port and when the compressed air is added to the pneumatic cylinder in the opposite direction the valve is moved to the opposite port. A shaft connected to the piston is connected to the valve's drive shaft, which allows the valve blade to move with the piston of the pneumatic cylinder.

To function properly, pneumatic systems depend on the constant availability of compressed air. In its simplest form, this can be provided by a cylinder of compressed air. However, such a system would only allow for a few cycles before the supply of compressed air was exhausted. Therefore, most pneumatic systems rely on compressors to generate compressed air, which use electricity or separate gas engines to constantly create compressed air as required to operate the system. Such systems typically require one or more storage tanks, a dryer system to remove water from the air, and lines and other fittings through which the air can move from one place to the other. A leak in any one of these components, including the pneumatic cylinder, or a failure of the compressor will cause a failure of the entire system making the valve actuator inoperable. Such systems are particularly difficult to operate in cold environments where any water in the air can cause the pneumatic cylinder to freeze. Additionally, such valve actuator systems can require far more energy to operate than those which can be powered directly with electrical power.

In addition to the problems listed above, pneumatic systems do not allow for the precise control of the valve blade's speed or position. Rather, pneumatically controlled valves typically move at the same speed from one position to another and back again. This often results in the violent collision of the valve blade into the valve seat, increasing wear and tear on each, and increasing the likelihood of failure. Additionally, instances have occurred where the valve blade has completely separated from its drive shaft, but the problem was not quickly detected because the pneumatic cylinder's piston, as well as the valve's drive shaft, continued to move back and forth even though the valve was entirely nonfunctional. Such instances can occur in pneumatic systems because the position of the valve head is either assumed, with no mechanism to detect its position, or a sensor is placed on the drive shaft so that its position is known and the position of the valve's blade is assumed to directly correspond with the position of the shaft. Of course, this assumption is false if the blade falls off the shaft or is otherwise compromised.

In such systems an alarm may activate if the sensor on the drive shaft detected that it was not moving at all or not moving a far as it should. Such alarm systems do not have the ability to measure whether the valve is properly seated with the proper seating force or if a blockage or other issue is causing the actuator to use more force than is typical to execute a cycle.

A pneumatic cylinder and solenoid is used as a discreet device. The controlling computer (PLC) sends a single discreet output which directs the solenoid to reverse direction and pressurize the cylinder to travel to the other seat. On arrival the disc (blade) crashes into the seat and then compresses as a spring. The PLC waits for the desired cycle time to elapse and then either removes the discreet output or turns off the "A" output and turns on the "B" output, reversing the pilot solenoid and pressurizing the opposite side of the pneumatic cylinder which sends the disc to the opposite wall where it crashes and compresses the disc into the seat on this plenum wall The system uses 2 poppet discs (blades) which operate in tandem but always travel if opposite directions, creating an A flow path and then a B flow path through the system.

FIGS. 1A and 1B (both should be viewed together) are prior art and illustrate the use of a pair of cooperating poppet valves in a RTO. FIG. 1A shows a first configuration, wherein valve A is in a first position and valve B is in a second position (the actual name of the positions is just a matter of semantics), The process gas enters into the RTO via an intake and because of the airtight seals of both valves, the path the gas takes is shown (more on the structure/operation of the RTO is discussed below). After a predetermined time elapses, both valves will simultaneously change to their opposite positions as shown in FIG. 1B. Because of the airtight seals of the valves, the process gas now takes the shown path (going in the opposite direction through the first chamber, combustion chamber, second chamber. After the predetermined amount of time elapses again, both valves will simultaneously change their position back to the positions shown in FIG. 1A, and this cycle continuously repeats.

The paths/structure shown in FIGS. 1A, 1B are merely exemplary and different paths/configurations of an RTO can be utilized as well. Due to the forces generated when the discs are touching the seats and compressing the disc spring very robust construction has been necessary to ensure longevity. The more robust the construction the more kinetic energy force is converted to potential at the point of impact.

The pneumatic system uses only two proximity sensors monitoring a flag on the driving shaft at approximate ends of stroke position. These sensors could only detect if the shaft traveled close to the expected distance.

What is needed is valve actuator system that does not require a fragile pneumatic system, which can be used to precisely control both the speed and position of the valve blade and can allow for the detection of the precise position of the valve blade all along its path of travel, including when it is against the seat, and can detect and signal any misalignments or other failures of the valve actuator system.

SUMMARY OF THE INVENTION

It is an aspect of the present device to provide an improved valve.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present device, as well as the structure and operation of various embodiments of the present device, will become apparent and more readily appreciated from the following description of the preferred embodiments, taken in conjunction with the accompanying drawings of which:

FIG. 11 is a further flowchart showing error handling, according to an embodiment;

FIG. 12 is a further flowchart showing error handling with an auto-correct function, according to an embodiment;

DESCRIPTION OF THE PREFERRED EMBODIMENTS

Figure 1A:
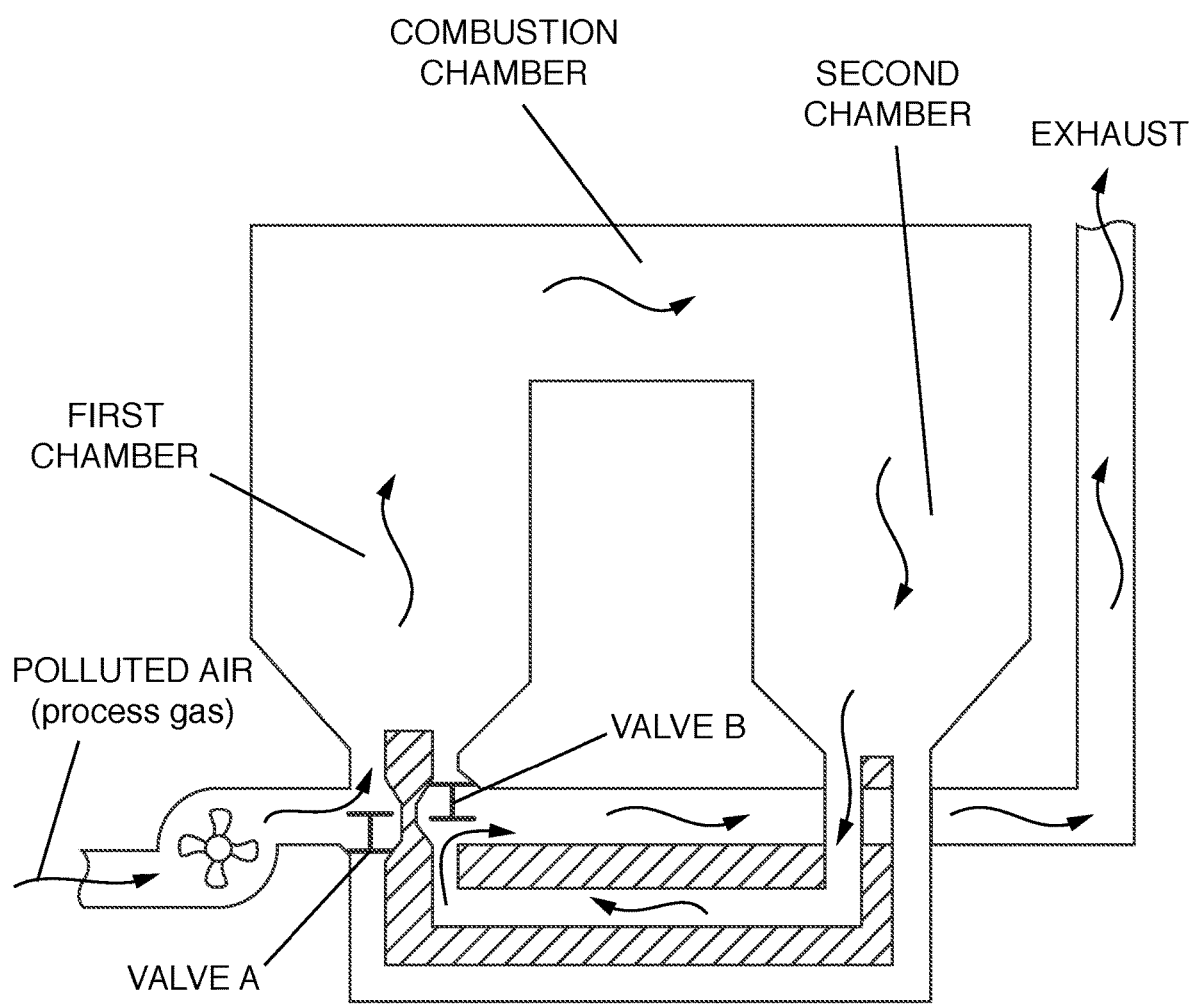
FIGS. 1A and 1B illustrate the use of a pair of cooperating poppet valves in an RTO as known in the art.

Reference will now be made in detail to the presently preferred embodiments of the invention, examples of which are illustrated in the accompanying drawings, wherein like reference numerals refer to like elements throughout.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Figure 1B:
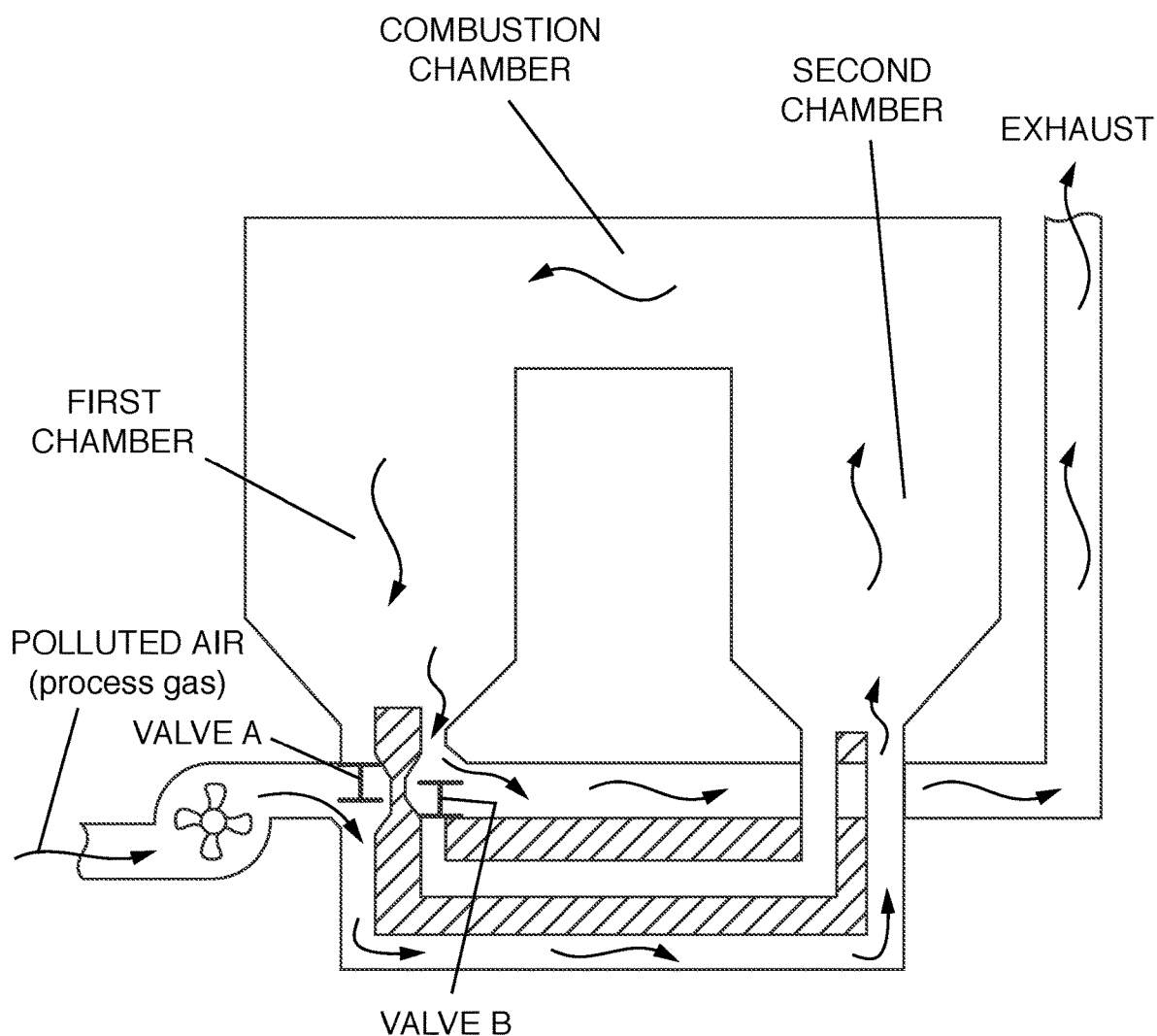
Figure 1C:
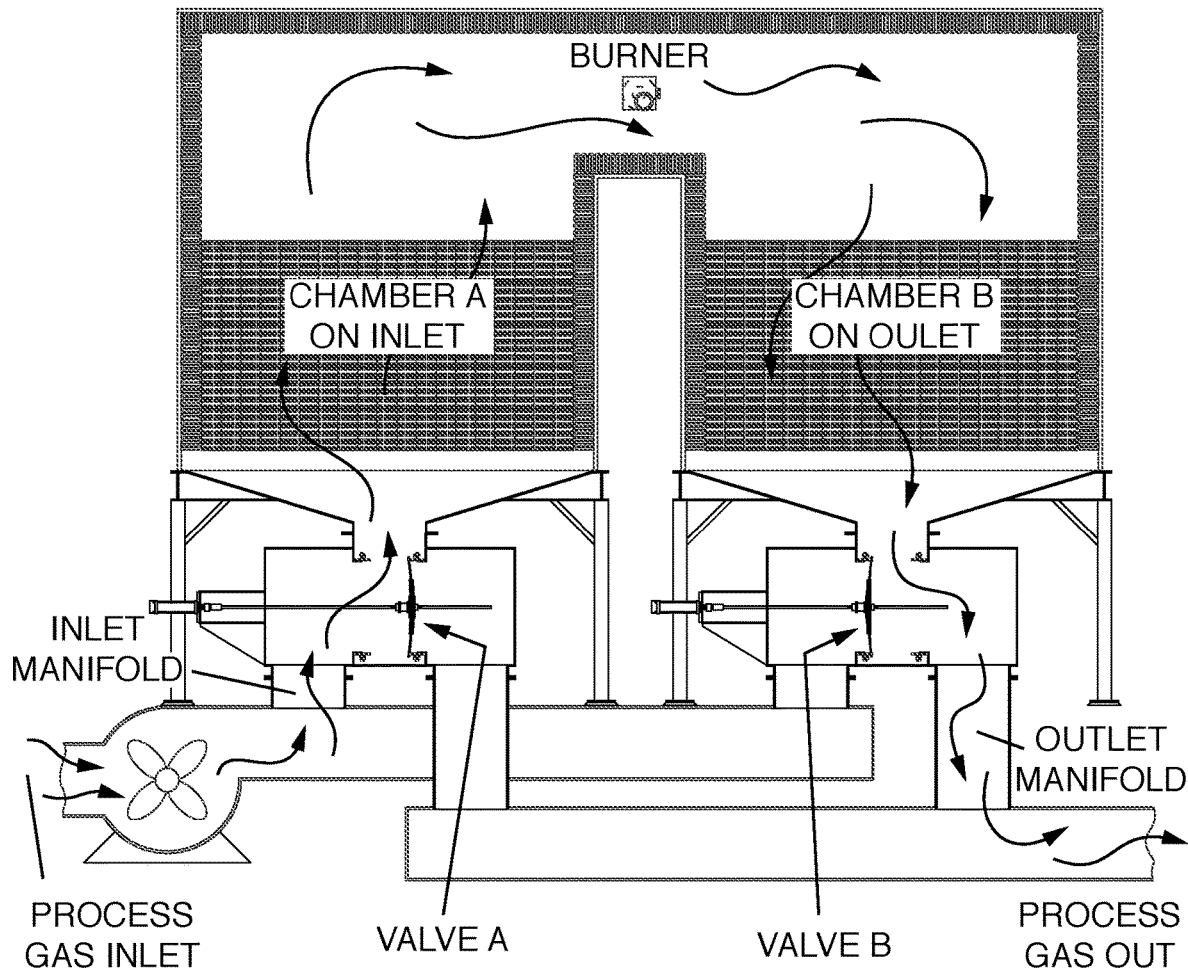
FIGS. 1C and 1D illustrate another configuration of the use of a pair of cooperating poppet valves in an RTO.
Figure 1D:
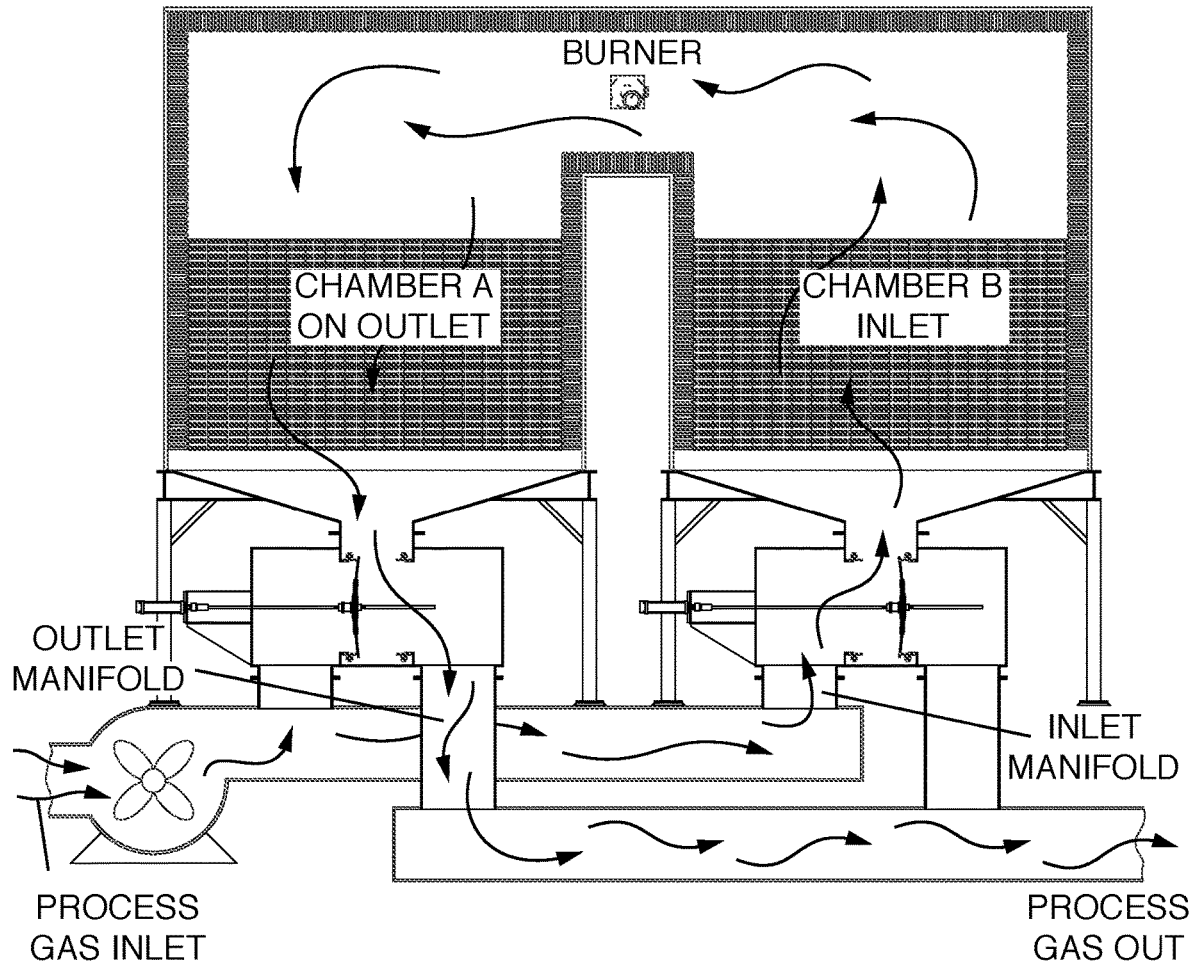

FIGS. 1C and 1D should be viewed together and illustrate another configuration of a Regenerative Thermal Oxidizer and how the positions of the poppet valves can reverse the flow therein. FIG. 1C shows the first cycle with chamber "A" (the chamber on the left) on inlet and chamber "B" (the chamber on the right) on outlet, while FIG. 1D shows the same RTO but in the next cycle with chamber "A" on outlet and chamber "B" on inlet. This cycle will continuously repeat after a predetermined time passes. Note that while the flow paths in FIGS. 1C, 1D as used in a RTO are not new, FIGS. 1C and 1D show the electronic valve as described herein (as opposed to a pneumatic valve) and thus FIGS. 1C, and 1D are not labeled as "prior art."

For many decades valves have been operated using many types of actuators. However, when the actuation has required tremendous force, hydraulic and pneumatic actuation has been chosen over electric actuation. While hydraulic and pneumatic actuation is capable of generating the great force required, such systems are difficult to maintain, relying on pumps and valves in a sealed system. Furthermore, such systems lack the precise control that electrical systems are able to offer. Recently, high-speed servomotors using rotary ball screws have become available. They can operate with speed and power comparable to pneumatic and hydraulic systems while maintaining the fine control and other features associated with electrical systems. The present system integrates the use of these new high-speed servomotors, with control and alarm systems within devices such as the valve systems of RTOs vastly improving performance and allowing for the adoption of multiple features, which were heretofore impossible using the pneumatic valve actuation. Specifically, the speed and position of the valve can be known at all times and controlled at all times. Furthermore, the force applied to the valve can be very finely controlled to create an airtight seal, maintain the seal for any desired length of time, confirm that the airtight seal has been made, and do so in a way that minimizes the wear and tear on both the valve and the valve seat, as well as the shaft and other parts of the valve actuating system.

Figure 1E:
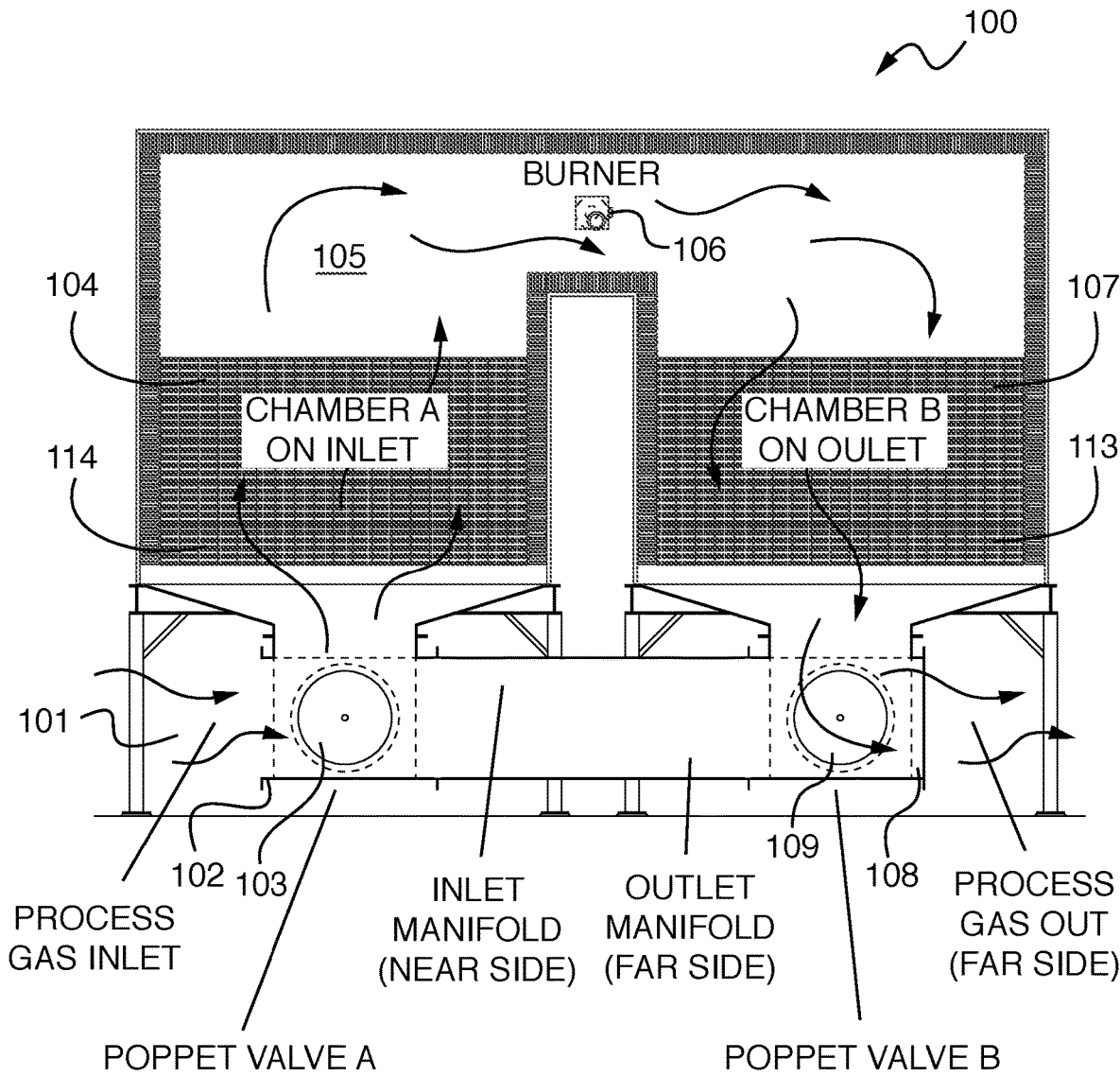
FIG. 1E is a front cross-sectional view of a regenerative thermal oxidizer, which is intended to be representative of those that currently exist in the prior art.
Figure 1F:
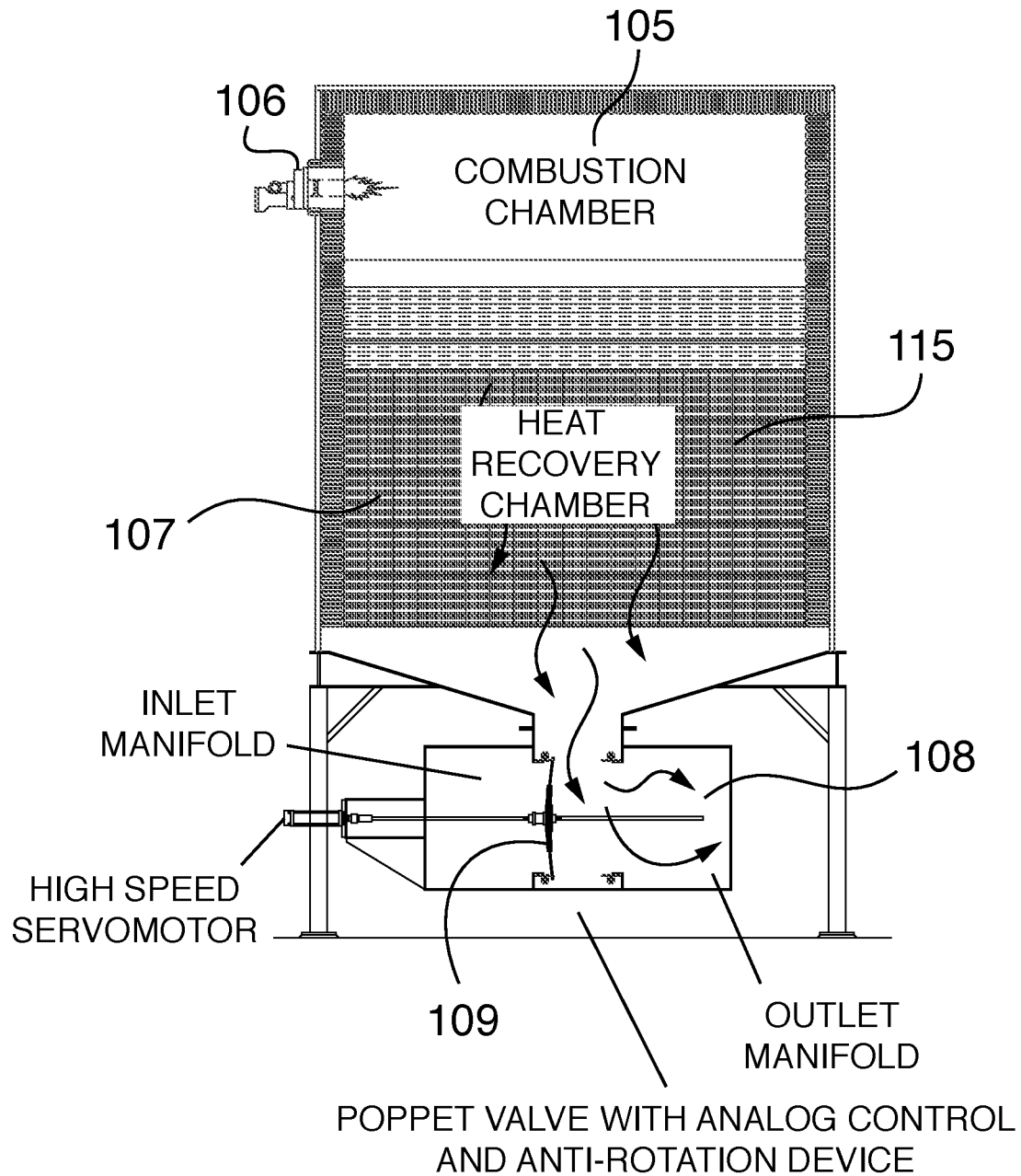
FIG. 1F is a side cross-sectional view of the regenerative thermal oxidizer, which is intended to be representative of those that currently exist in the prior art.

The basic design of a regenerative thermal oxidizer ("RTO") 100 is illustrated in FIG. 1E and FIG. 1F. FIG. 1E is a front cross-sectional view of an RTO 100, which is intended to be representative of those that currently exist in the prior art. In this illustration, process gas (polluted air) 101 is introduced into the RTO 100 at the lower left, through a first manifold 102. In this cycle of the RTO 100, flow of the process gas 101 within the first manifold 102 can be controlled by a first manifold poppet valve 103. As discussed in more detail below, when the first manifold poppet valve 103 can be in a first position, wherein the first manifold poppet valve 103 can be open, process gas 101 can be directed through the first manifold 102 into a first chamber 104, which can contain a first set of heat exchange media 114. Such media 114 can be comprised of a ceramic material or a similar material further comprising passageways through which the process gas 101 can flow. The heated process gas 101 can then flow into a combustion chamber 105 comprising a burner 106, which can be fueled by natural gas. The pollutants in the process gas 101 can be ignited by the burner in the combustion chamber in the presence of oxygen thus oxidizing the pollutants, typically organic compounds, to carbon dioxide and water, but also causing the now treated process gas 101 to become extremely hot, typically between 1450 and 1950 degrees Fahrenheit. This treated and heated process gas 101 can then flow through a second chamber 107, which can comprise a second set of heat exchange media 115, comprised of a ceramic material further comprising passageways through which the treated and heated process gas 101 can pass through the media 115 where it is cooled from between 1450 and 1950 degrees Fahrenheit to 100-950 degrees Fahrenheit. The cooled and treated process gas 101 can then flow through a second manifold poppet valve 109 and into an outlet manifold 108 to be directed to an exhaust stack (not shown). As discussed in more detail below, when the second manifold poppet valve 109 is in a first position, process air is directed through the second manifold 102 to the exhaust stack and when the second manifold poppet valve 109 is in a first position, untreated process gas 101 is directed through the second manifold 108 into the second chamber 107.

During the cycle described above, the first set of heat exchange media 114 in the first chamber 104 can be cooled by the untreated process gas 101 as it flows through the first chamber 104. Likewise, the second set of heat exchange media 115 in the second chamber 107 can be heated by the treated process gas 101, which has just been combusted, as it flows through the outlet chamber 107. Therefore, it is necessary to periodically reverse the flow of the process gas 101 through the RTO 100 such that process gas 101 is heated before it enters the combustion chamber 105 and cooled after it leaves the combustion chamber 105. This cycling can be made possible by the first manifold poppet valve 103 and the second manifold poppet valve 109, which can open and close in concert to reverse the flow of process gas 101 through the RTO 100. Such cycle is repeated continuously (e.g., each valve remains in a same position for a predetermined period of time, then both valves reverse their position simultaneously, then remain in that position for the predetermined of time, then both valves reverse their position, and so on.)

FIG. 1F is a side cross-sectional view of the regenerative thermal oxidizer, shown in FIG. 1E, which is intended to be representative of those that currently exist in the prior art. In this view, heated process gas 101, which is flowing out of the combustion chamber 105, can be seen flowing through the second chamber 107, where it has been cooled and the second set of heat exchange media 115 in the second chamber 107 can be simultaneously heated. The cooled and treated process gas 101 can then be directed out of the second chamber 107 and into the second manifold 108 by the second manifold poppet valve 109, which is in the second position, which can direct the cooled and treated process gas 101 to an exhaust stack (not shown). If the second manifold poppet valve 109 were in the first position, air would flow from the first manifold 102, through the second chamber 107, where the untreated process gas 101 can be heated by the heat exchange media 115, which had previously been heated by the combusted process gas 101 exiting the combustion chamber 105. Likewise, when the process gas 101 flows in this direction, it is cooled by the first set of heat exchange media 114. The cooled and treated process gas 101 can then be directed out of the first chamber 104 and into the first manifold 102 by the first manifold poppet valve 103, which can be in the second position directing the cooled and treated process gas 101 to an exhaust stack (not shown). FIG. 1F shows an electronic poppet valve as described herein, and as such FIG. 1F is not labeled as "prior art" although the remaining aspects of the RTO are known in the art.

Figure 2:
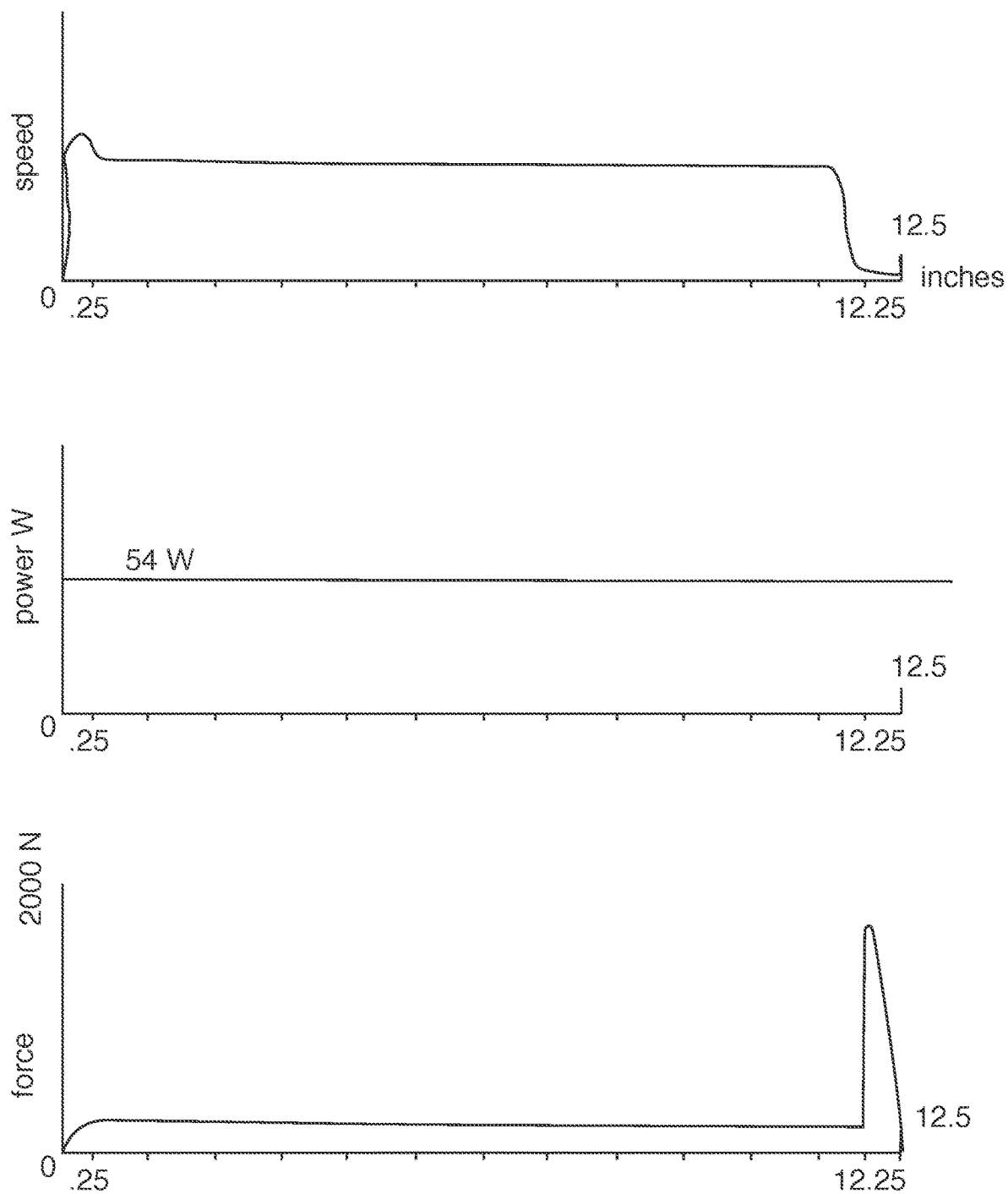
FIG. 2 shows three graphs showing response behavior of a prior art pneumatic valve.

FIG. 2 shows three graphs showing response behavior of a prior art pneumatic valve. The first graph shows distance on the x-axis vs speed on the y-axis. The second graph shows distance on the x-axis vs power. Note that the power to the pneumatic valve remains constant. The third graph shows distance on the x-axis vs force (on the blade). One thing to note is as the blade impacts the seat, the force (trauma) on the blade is very high.

Figure 3A:
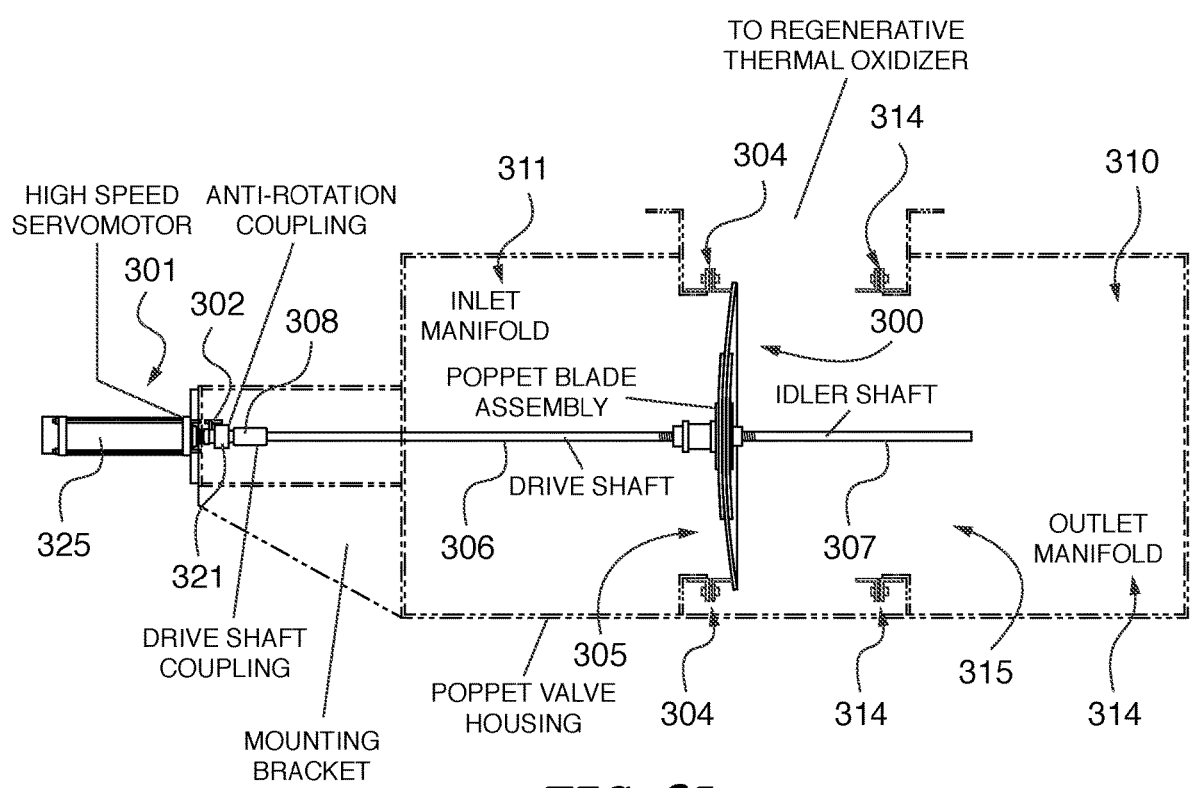
FIG. 3A is a front cross-sectional view of a poppet valve, comprising an analog actuator and an anti-rotation coupling, in a second position, wherein the valve has been seated to create an airtight seal and direct treated process gas from the RTO into an outlet manifold, according to an embodiment.

FIG. 3A shows a front cross-sectional view of a poppet valve assembly 300, comprising an analog actuator assembly 301 comprising an anti-rotation coupling 302, in a second position, wherein the poppet blade assembly 303 has been seated against an inlet valve seat 304 to create an airtight seal of a port A 305, according to an embodiment. In the embodiment depicted in FIG. 3A, the poppet valve assembly is located within a manifold system 310 comprising an inlet manifold 311 on one side and an outlet manifold 312 on the other side. When the poppet blade assembly 303 is in the second position, as depicted in FIG. 3A, treated process gas (not shown) can be directed from the RTO (not shown in FIG. 3A) into the outlet manifold 212 where the it can flow to a stack (not shown) to be exhausted into the atmosphere. The poppet blade assembly 303, comprising the poppet valve assembly 300 can be constructed such that it can be moved to a first position (not shown) to be seated into an outlet valve seat 314 to create an airtight seal of a port B 315. With the poppet blade assembly 303 in this first position process gas could be directed from the inlet manifold 312 into the RTO where the process gas can be combusted and cleaned. Movement of the poppet blade assembly 303 can occur when an attached drive shaft 306, which can be connected to the poppet blade assembly 303, is moved in a longitudinal direction, perpendicular to the orientation of the poppet blade assembly 303 from a second position to a first position within the poppet valve assembly 300. In some embodiments, an idler shaft can be used to ensure that the poppet blade assembly 303 remains properly aligned as it moves from the first position to a second position and vice versa within the poppet valve assembly 300.

Figure 3B:
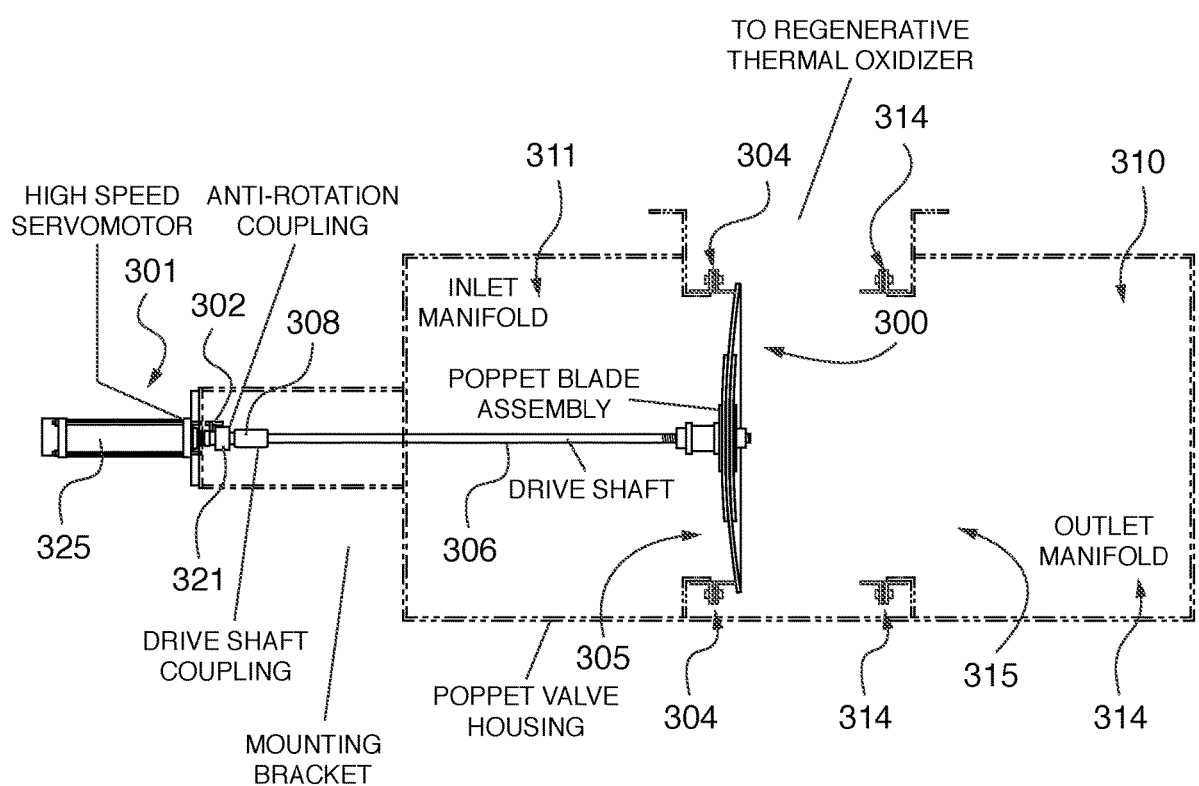
FIG. 3B shows an embodiment of the poppet valve without the idler shaft.

According to an embodiment, a drive shaft 306 can be actuated by an analog actuator assembly 301, which can connect to the drive shaft 306 comprising the poppet valve assembly 300. In the embodiment depicted in FIG. 3A, the drive shaft 306 can be connected to a rotary ball screw 321 comprising a high-speed servo motor assembly 320, or similar device comprising an analog actuator assembly 301, by a drive shaft coupling 322. In the embodiment depicted in FIG. 3A the rotary ball screw 321 comprising a high speed servo motor assembly 320 can be a screw-type, extendable shaft, which can connect to the drive shaft coupling 322 using an anti-rotation coupling 302, which can prevent misalignment of the rotary ball screw 321 to the drive shaft 306 as will be discussed in more detail below. Note FIG. 3B shows an embodiment of the poppet valve without the idler shaft;

According to an embodiment, a high-speed servo motor 325 can be electrically driven, and the speed and position of its rotary ball screw 321 can be precisely controlled by controlling an electric current (not shown) to the high-speed servo motor 325. It is estimated that an electrically operated high-speed servo motor 325, such as those sufficient to operate the poppet valve assembly 300, can be up to eighty-five percent (85%) efficient. By comparison, pneumatic actuators sufficient to operate the poppet valve assembly 300, are typically only ten percent (10%) to fifteen percent (15%) efficient.

Figure 4:
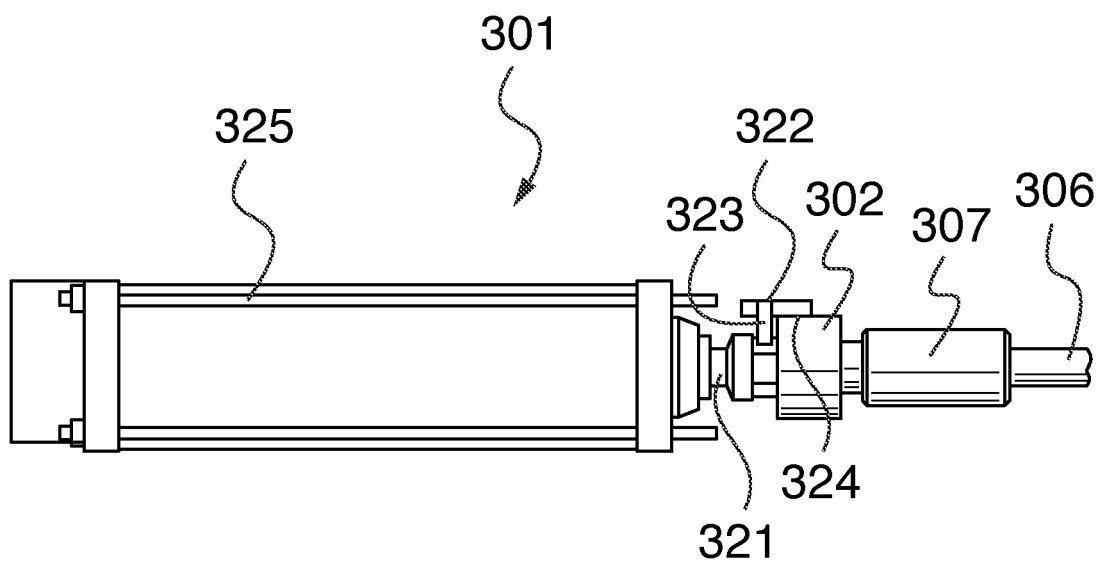
FIG. 4 is a magnified view of the couplers connecting the servomotor to the drive shaft, according to an embodiment.

FIG. 4 is a magnified view of the analog actuator assembly 301 comprising an anti-rotation coupling 302, as shown in FIG. 3A, connecting the high-speed servo motor 325 to the drive shaft 306, according to an embodiment. In this view, the anti-rotation coupling 302 and the drive shaft coupling 307 are shown in transparent view such that the position and orientation of the rotary ball screw 321 as connected to the anti-rotation coupling 302 as connected to the connecting shaft 308, connecting the anti-rotation coupling device 302 to the drive shaft coupling 307 and to the drive shaft 306. As discussed in more detail below, the alignment of each of these shafts and couplings is critical to the proper function of the poppet valve assembly 300.

Figure 5A:
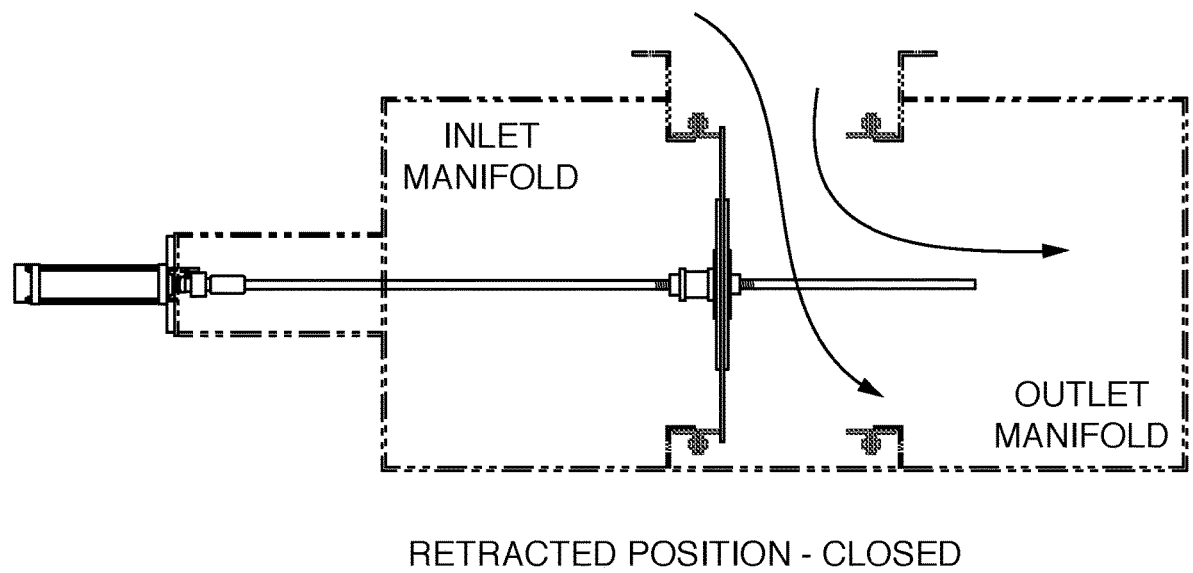
FIG. 5A is a front cross-sectional view of a poppet valve in the second position, wherein a sealing force has not been applied, according to an embodiment.
Figure 5B:
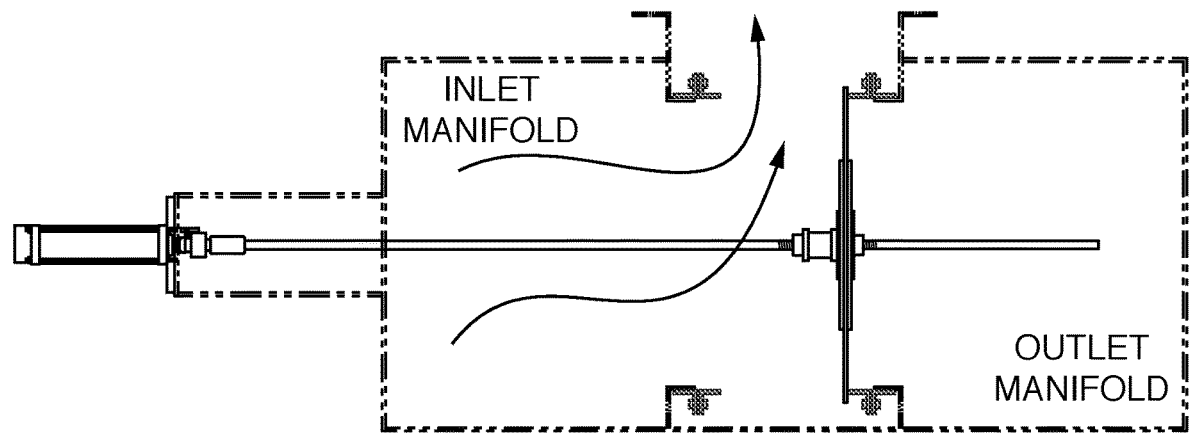
FIG. 5B is a front cross-sectional view of a poppet valve in a first position wherein untreated process gas is directed from the inlet manifold into the RTO, wherein a sealing force has not been applied, according to an embodiment.
Figure 5C:
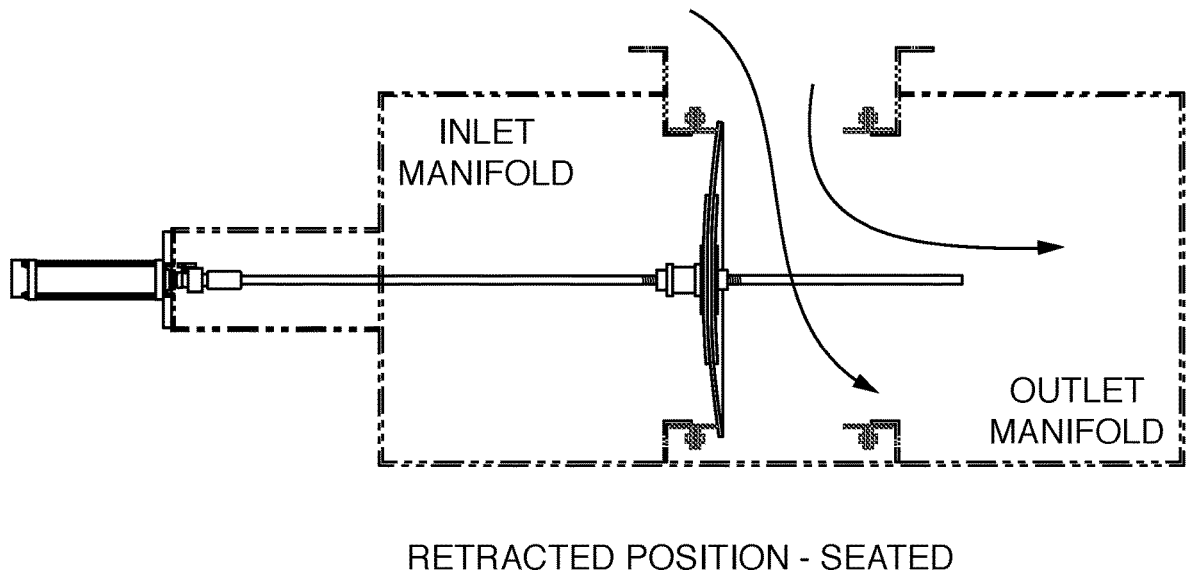
FIG. 5C is a front cross-sectional view of a poppet valve in the second position, wherein a seating force has been applied and the valve has been seated to create an airtight seal, according to an embodiment.
Figure 5D:
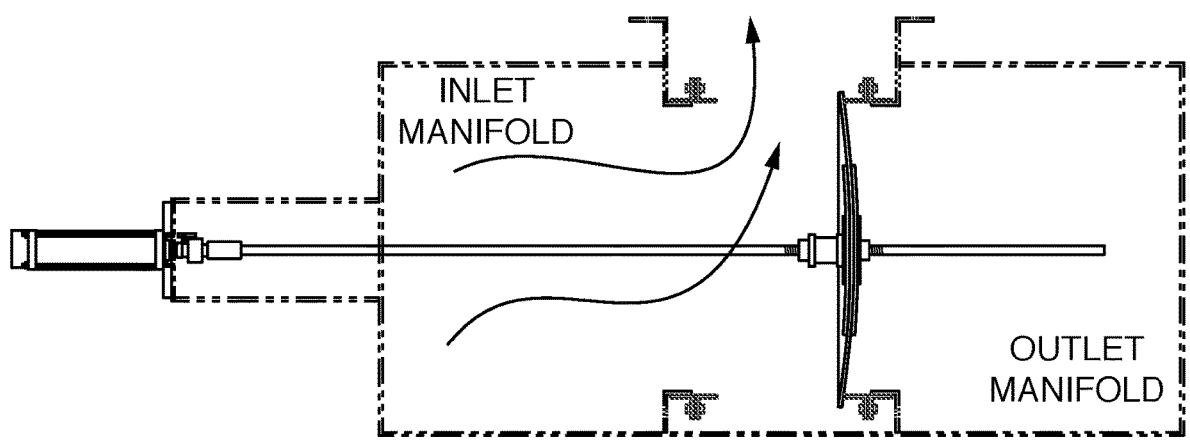
FIG. 5D is a front cross-sectional view of a poppet valve in the first position, wherein a seating force has been applied and the valve has been seated to create an airtight seal, according to an embodiment.
Figure 5E:
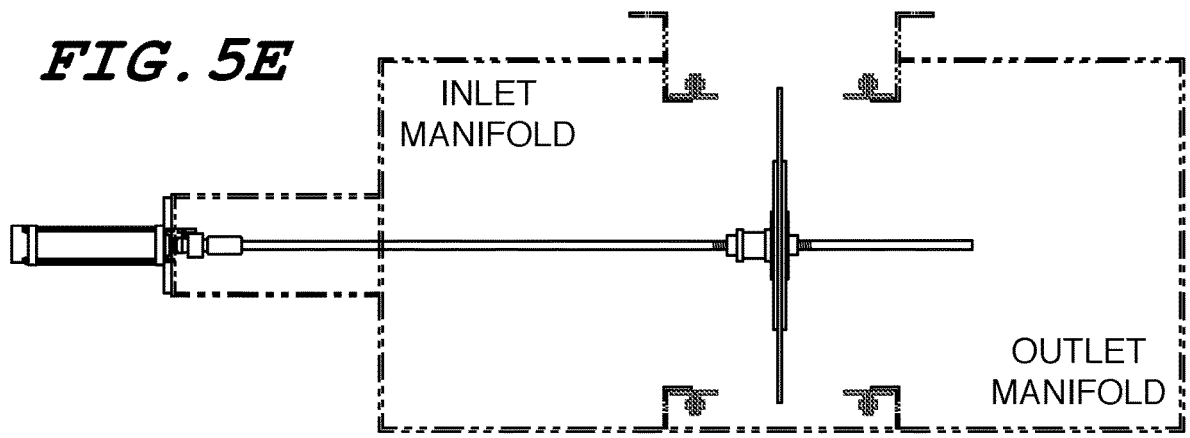
FIG. 5E is a front cross-sectional view of a poppet valve in a maintenance position, which is between the first position and the second position, wherein the valve can be accessed for inspection and repair, according to an embodiment.
Figure 6A:
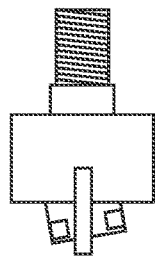
FIGS. 6A, 6B, 6C, 6D, 6E, 6F, 6G are various views of an anti-rotation coupling device wherein a ball screw shaft is properly aligned to the anti-rotation coupling device or is misaligned to indicate what the anti-rotation coupling device is designed to prevent, according to an embodiment.
Figure 6B:
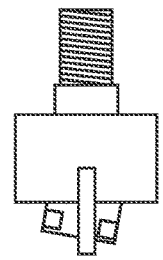
Figure 6C:
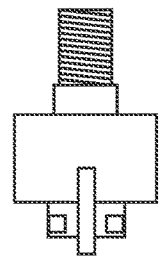
Figure 6D:
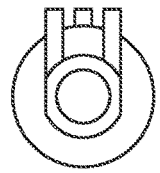
Figure 6E:
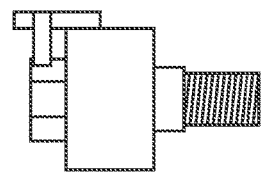
Figure 6F:
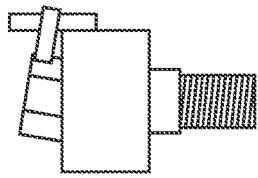
Figure 6G:
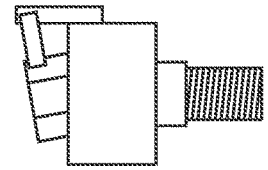

FIGS. 5A thru 5E show the poppet valve assembly 300 in various positions and depict the flow of process gas through it when in each position. Specifically, FIG. 5A is a front cross-sectional view of a poppet valve in the second position, wherein a sealing force has not been applied, according to an embodiment. FIG. 5B is a front cross-sectional view of a poppet valve in a first position wherein untreated process gas is directed from the inlet manifold into the RTO, wherein a sealing force has not been applied, according to an embodiment. FIG. 5C is a front cross-sectional view of a poppet valve in the second position, wherein a seating force has been applied and the valve has been seated to create an airtight seal, according to an embodiment. FIG. 5D is a front cross-sectional view of a poppet valve in the first position, wherein a seating force has been applied and the valve has been seated to create an airtight seal, according to an embodiment. Finally, FIG. 5E is a front cross-sectional view of a poppet valve in a maintenance position, which is between the first position and the second position, wherein the valve can be accessed for inspection and repair, according to an embodiment. Furthermore, this maintenance position can be used to allow air to flow uninhibited past the RTO if needed.

FIGS. 6A, 6B, 6C, 6D, 6E, 6F, 6G contain various views of an anti-rotation coupling device wherein a ball screw shaft is either properly aligned to the anti-rotation coupling device or is misaligned to indicate what the anti-rotation coupling device is designed to prevent, according to an embodiment. In view 6A, which is a top view, the rotary ball screw 321 is misaligned to the left so as not to be in the same axis as the anti-rotation coupling device 302. In view 6B, which is also a top view, the rotary ball screw 321 is misaligned to the right so as not to be in the same axis as the anti-rotation coupling device 302. In view 6C, which is also a top view, the rotary ball screw 321 is properly aligned with, and in the same axis as the anti-rotation coupling device 302. View 6D is a front view of this same alignment and view 6E is a side view of it as well. In view 6F, which is a side view, the rotary ball screw 321 is misaligned downward so as not to be in the same axis as the anti-rotation coupling device 302. Finally, view 6G, which is also a side view, the rotary ball screw 321 is misaligned upward so as not to be in the same axis as the anti-rotation coupling device 302.

The proper alignment of the shafts and couplers is critically important as the high-speed servo motor 325 (not shown in FIG. 6) typically moves the poppet valve assembly 300 with great force as necessary in an RTO. If that force is transmitted to the poppet blade assembly 303 through a misaligned shaft or coupler, the entire poppet valve assembly 300 can be bent or destroyed. To avoid this, the present anti-rotation coupling device 302 can physically secure the rotary ball screw 321 using a welded keystock assembly 322, which in the depicted embodiment is a T-shaped device connecting to the anti-rotation coupling device 302 at a first point 323 and to the anti-rotation coupling device 302 at a second point 324. The present anti-rotation coupling device 302 can be particularly useful when using a high-speed servo motor 325 connected to a rotary ball screw 321 because the in and out movement of the rotary ball screw 321 occurs due to its rotation by the high-speed servo motor 325 and this rotation, if not accounted for, can lead to the misalignment of the rotary ball screw 321 in relation to the drive shaft 306.

The poppet valve described herein is a spring steel multi laminate disc that travels between steel seat rings in 2 plenum walls. At the point of seat contact the poppet shaft drives the disc an additional distance to ensure tight closure, reducing leakage, and resisting the force of static pressure of the process gasses.

The electric actuator used in this poppet valve is an analog device, which knows its position throughout the travel distance and the amount of power it is consuming at all times. It is programmable through its servomotor to travel a known distance and then can slow or change direction and/or force (power) consumed. This information is continuously relayed back through an ethernet link to a control computer where the power consumed and distance traveled are stored and compared to expected values.

This allows the control computer to monitor travel distance, force to compress the poppet spring at seating and to alarm or execute emergency functions if these parameters fall out of range. Additionally the control computer can command the servo-motor via this link to adjust servo internal parameters such as deceleration zone, power for compression and speed of travel. Because it is an analog device the servo-motor can command the disc to stop at any position within the travel range, allowing for a mid-stroke stop (see FIG. 4E) which was previously unachievable. This mid-stroke stop can enable a full flow process gas bypass through the poppet system during an emergency, creating an emergency vent.

As an example, a small poppet system would have a disc and shaft and coupling weighing 100 Lbs. and traveling between 2 seats 12 inches apart with a compression travel of ¼ inch at each step seat.

An example will now be presented of both a pneumatic system and an electrical system described herein.

In a sample pneumatic system, the kinetic energy of traveling disc and shaft is $KE=(0.5\ M\times v2)/d$, with disc mass=22.6795 kg, Distance traveled=0.305 m/s, Stroke time=0.5 seconds (22.6795×0.3727)/0.305=27.71 Newton/m/s traveling KE, Impact where KE>PE, Travel to impact and compression (22.6795×0.3727)/0.00633=1,334.91 Newton/m/s In an electric system, the kinetic energy of traveling disc and shaft is $KE=(0.5\ m\times v2)/d$, with disc mass=22.6795 kg, distance traveled=0.305 m/s, Stroke time=0.5 seconds (22.6795×0.3727)/0.305=27.71 Newton/m/s traveling KE, Impact where KE>PE. Deceleration of disc and shaft=20 Newton/m/s regenerated into DC buss of servomotor. Thus, the Travel to contact and compress=66.7 Newton/m/s All of this activity occurs in 0.5 second. After the disc is compressed the control computer begins its cycle time which may vary from 90 seconds (or less but greater than 0) to 200 seconds (or more) before the reversal is initiated and the 0.5 second travel and compress occurs and another equal cycle time begins. The cycle time can be any other such time, e.g., 30 second to 40 minutes.

In the Pneumatic system, at the end of the disc compression the pneumatic system still exerts 100 PSI onto the shaft and disc. This necessitates energy expenditure to produce the compressed air, refrigerant dry and then desiccant dry the air and pressure losses to transmit the air to the solenoids.

In the electric system, at the end of the electric actuator cycle the PLC verifies the distance and power to compress are within boundaries and then initiates an electric brake which is an added external package to the drive motor. After allowing for a few milliseconds for this brake to engage the PLC directs the servo VFD to de-energize the drive motor, reducing power consumption and allowing the motor to cool during the cycle time. This increases drive longevity and reduces wear and energy consumption.

The 20 fold reduction of force at impact and compression by using the electric servo system described herein will allow for reduction in mass of components which no longer need to be so robustly fabricated to tolerate lower impact and compression forces. This reduction will lower even further the force to travel to contact and compress.

Knowing the position and force at all positions of travel allows for control computer diagnostics and early detection of variances, reducing failure occurrences and severity. The control computer can detect if the disc is in compression at the end of stroke, which is a desired measured variable.

Figure 7:
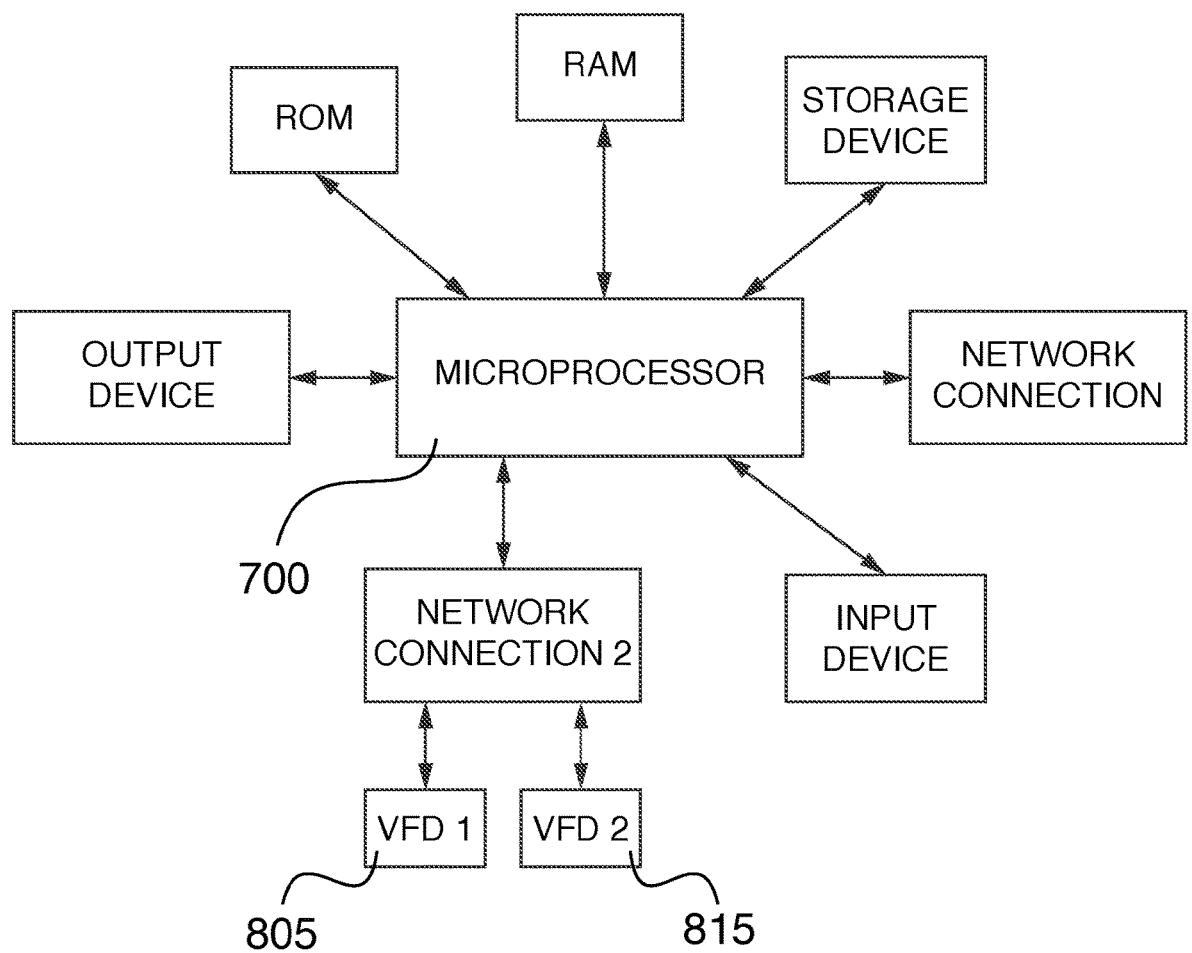
FIG. 7 is a block diagram of a computer that can be used as the control computer, according to an embodiment.

FIG. 7 is a block diagram of a computer that can be used as the control computer, according to an embodiment. This general structure can be used as the control computer 800 (also referred to as PLC), and any other computing device used (or needed) herein. For example, the general structure of a variable frequency drive could be implemented using the general structure shown in FIG. 7 (but without the network connection 2 and the two VFDs 805 815).

A microprocessor 700 can be connected to a ROM, RAM, storage device (e.g., hard drive which can read/write to a non-volatile non-transitory computer readable storage medium (e.g., a hard disk), a network connection (which can connect to any computer communications network (local or non-local), such as the internet, etc.) The microprocessor 700 can also be connected to an input device (e.g., a keyboard, switches, mouse, touch-screen, etc.) and an output device (e.g., LCD, touch-screen, speakers, etc.) The microprocessor 700 can be programmed to (e.g., read a program stored on a non-transitory computer readable storage medium) to perform all of the operations/features described herein which are capable of being implemented by a computer. A network connection 2 can be a bus, Ethernet connection, or any other type of connection that can interface with (both inputting from and outputting to) a VFD. One or more VFDs may connect to the microprocessor 700 via multiple different types of connections (e.g., combination of Ethernet, bus, etc.) Note that any component in FIG. 7 and FIG. 8 can connect and/or communicate (in either or both directions) to any other component illustrated therein (or described herein), whether such connection/communication is shown or not.

Figure 8:
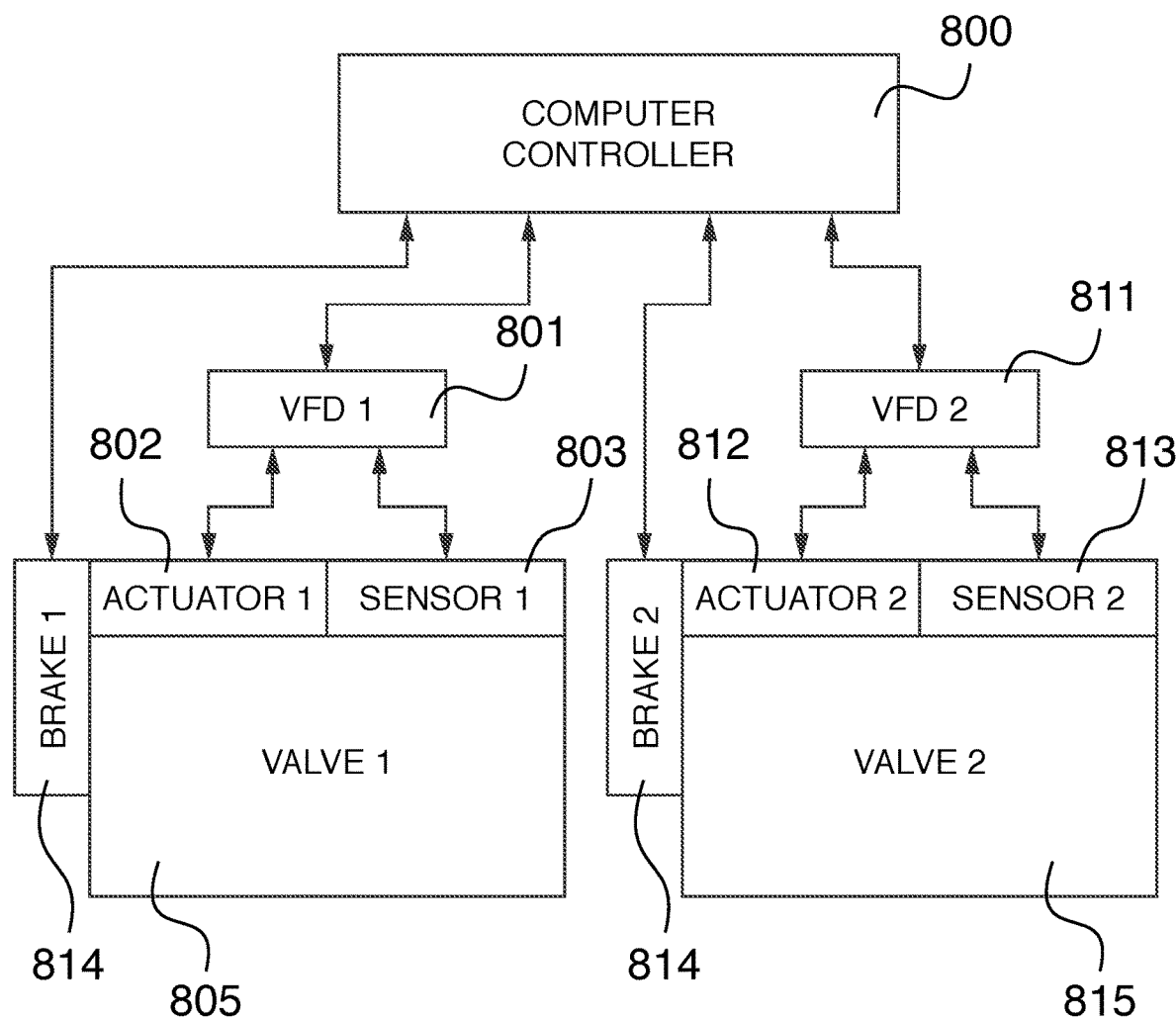
FIG. 8 is a block diagram of an overall logical structure (not physical) of a pair of electronic poppet valves which can be used in an RTO, according to an embodiment.

FIG. 8 is a block diagram of an overall logical (not physical) structure of a pair of electronic poppet valves which can be used in an RTO, according to an embodiment.

A control computer 800 (also referred to as PLC, also abbreviated as CC) is a digital computer which comprises a microprocessor, RAM, non-volatile storage, an operating system, an input device (e.g., keyboard), an output device (e.g. LCD), bus, network connection(s), and any other known computer component needed, all operationally interconnected. The control computer 800 can receive an input (analog or digital) from any component described herein so the control computer 800 can continuously monitor the operation of the entire system and detect abnormalities. The control computer 800 receives all outputs/signals from a variable frequency drive (VFD) for example via an Ethernet, wi-fi, or other connection) and can also control the VFD (e.g., reprogram it, start it, stop it, etc.) typically via the same mode of connection (e.g., Ethernet, wi-fi, etc.) The control computer 800 can interrupt and hence override any current program being executed by the VFD. The output signals that the control computer 800 can receive and monitor from the VFD can include amperage, voltage, any communications from the VFD (e.g., error codes, status codes, etc.), sensor data (e.g., data from an encoder so distance can be computed by the control computer), and any other parameter described herein. The control computer 800 and the VFDs would all be programmed to cooperate and implement all of the methods described herein, which would include, for example, converting sensor data (from the encoder) to determine a position of the actuator (or travel distance), computing the expected travel distance based on the other parameters of the system (e.g., voltage, frequency, prior position of the actuator, etc.). Such programs can be stored on a non-transitory computer readable storage medium (e.g., disc, ROM, RAM, flash drive, hard drive, etc.) The VFD itself has its own power source and is what is used to drive its respective actuator based on its own program and instructions from the control computer. All such parameters received from the VFD are received in real time and can all be continuously stored in digital form on a computer readable storage device (e.g., hard disc, etc.) over a long period of time (e.g., all parameters can be preserved for the past 24 hours, past week, past year, or always preserved). In this way, all of the details of the operation of the system can be preserved in case of a problem/error, the previous conditions of the system can be examined. The control computer 800 can also operate each brake 804, 814 and can both engage each one and disengage each one.

Valve 1 805 (which can have the structure described herein) has its own variable frequency drive (VFD 1 801) which is connected to and controls actuator 1 802. Technically, the VFD 1 801 controls a servo motor which is part of the actuator 1 802. using a power output from the VFD which can vary the frequency and voltage/amperage to the actuator 1 802 according to a program which is programmed into the VFD 1 801. Thus, in other words, each VFD is programmed to continuously implement a pattern on its respective actuator. Actuator 1 802 can be connected to a first drive shaft (not pictured in FIG. 8) which is connected to a first blade (not pictured in FIG. 8). Also not pictured in FIG. 8 is two seats (each valve would have two seats, and when the blade makes a seal with a first seat then the valve is in a first position and when the blade makes a seal with a second seat then the valve is in the second position). When the first blade makes contact with the first seat then the first valve can be considered to be in the extended (closed) position, and when the first blade makes contact with a second seat then the first valve can be considered to be in the retracted (open) position. What is considered "open" and "closed" is just a matter of semantics and they can be reversed. What is considered the "first" and "second" seat is also a matter of semantics (they can be reversed), and the seats can also be referred to as "front" and "rear", etc. When the first blade is not making contact with either seat then the blade is considered to be in "mid-stroke." The actuator 1 802 can move the drive shaft (and hence the blade) linearly, either in a forward direction (towards one seat) or in a backwards direction (award from that seat). Again, what is considered "forward" and "backward" is just a matter of semantics.

A sensor 1 803 monitors a position of the actuator 1 802 and hence the first drive shaft. The sensor 1 803 can be any suitable component, such as an absolute encoder, which can measure (e.g., using hall effect or any other such principle) the rotation of the servo motor and its rotational direction. There would be a simple linear relationship between the number of rotations of the motor and the position of its actuator and hence the drive shaft. Thus, by counting the number of rotations in a particular direction, it would be easy to figure out the actual position of the actuator (or other part of the system such as the blade, shaft, etc.) When the servo motor rotates in an opposite direction then the actuator would move in the opposite direction. Alternatively (or additionally), the sensor 1 803 can be an optical detector which optically scans the actuator 1 802 and/or the first drive shaft which would have unique optical markings so that the sensor 1 803 can determine how far extended the first drive shaft is. The sensor 1 will continuously transmit its position data (e.g., rotation data of the servomotor driving the actuator 1 802 and/or its servo motor, position data of the first shaft, etc.) to the VFD 1 801 which would then transit the position data to the control computer 800. The position data can be, for example, a rotation amount of the servomotor (direction and amount of rotations), for example 1 rotation clockwise, 0.5 rotation counterclockwise, etc. All of the rotations can be summed (one rotational direction has a positive sign and the opposite rotational direction has a negative sign) and from this sum the number of net rotations (and direction) can be determined which can then be used to determine the location of the actuator, shaft, blade, etc.

Valve 1 also has its own external brake 1 804 which can be a clutch and is controlled by the control computer 800. The brake 1 804 can, upon being instructed by the VFD 1, physically clamp down on a shaft of the servomotor (or motor) which drives the actuator 1 802 thereby slowing and ultimately stopping its rotation (thereby stopping motion of the actuator).

Note that in addition to the external brake 1 804, each valve also can have a deceleration braking function (different from the physical brake) by reducing the frequency and voltage to the servo motor of the actuator 1 802 which causes it to slow down or drag and can then act as a generator to the VFD 1 801. When the first blade approaches the first seat, the VFD 1 (by virtue of how it is programmed) will then decrease the voltage and frequency thereby causing the servo motor of actuator 1 802 to utilize the kinetic energy of the traveling blade which would act as a generator back to the VFD which would cause the movement of the actuator to slow down. This slowdown can be helpful in order to reduce the impact of the blade on the seat when contact between the blade and either seat is made.

There a second valve (valve 2 815) in the RTO 815 that has the same structure has the valve 1 805. Valve 2 815 also has an actuator 2 812, sensor 2 813, brake 2 814, and VFD 2 811. Each of these components in the second valve (actuator 2, sensor 2 813, brake 2 814, VFD 814, and any other associated structure/component) is the same as described with regard to their counterparts in the first valve except that they operate on valve 2 815 and the valve 2 components. Thus, there is no need to repeat the description herein for the components that operate on valve 2 815.

The control computer 800 monitors both valves simultaneously and continuously. The control computer 800 receives parameters in real time from each VFD (VFD 1 801 and VFD 2 811) such as temperature of the VFD and/or valve, amperage, positional data from the sensors, power, load, etc. The control computer 800 can alternatively receive positional data in real time directly from each sensor (sensor 1 803 and sensor 2 813). The control computer 800 continuously analyzes the real time data to determine whether there is an abnormality (a fault). If there is a fault, then the computer can take control (override) each VFD and instruct the VFD to cause the valve to take a respective action, such as retract, extend, stop in a mid-stroke position (middle between retracted position and extended position as in FIG. 4E), etc. As such, both valves are programmed to operate cooperatively in the RTO (when one is open/extended, the other is closed/retracted) and they would both typically change into their opposite positions at approximately the same time.

If a fault occurs, then in addition to automatically putting the valve(s) into a respective position (depending upon the fault type), an alarm can sound which would alert operators to the presence of a problem.

Note that the VFDs themselves are off the shelf components and can be programmed to control operation of their respective valve in numerous ways. The VFDs 801, 811 are identical components (as typically are all of the other parts of each of the two valves), and contain a keypad. The keypad can be used to enter in initialization parameters for the VFD, such as maximum currents, number of poles of the motor it is driving, etc. After the initialization parameters are entered, then the VFD can be programmed with the keypad to repeat a cycle of parameters. For example, values for parameters such as speed, current, frequency, voltage, etc., can be programmed to change based on a real time parameters (e.g., time, distance, etc.) so that the VFD can operate autonomously and continuously repeat its program while driving its motor (or servo-motor) on its actuator. In an alternate embodiment, the control computer 800 can continuously monitor and instruct the VFD as to what parameters it should be outputting to its motor (e.g., speed, current, frequency, voltage, etc.) in real time based on time, distance, etc. This alternate embodiment is similar to the VFD operating autonomously but instead of the VFD controlling the motor autonomously, the control computer 800 is what is controlling the VFD to the control the motor.

The VFD also receives inputs (referred to as detected inputs) from the motor and other parts of the system (e.g., temperature of motor (or any other part of the valve), current, voltage, power, frequency, etc.) and can be programmed to detect faults (abnormalities of any of these detected inputs). In addition (or alternatively), the VFD would transmit these detected inputs back to the control computer 800 which then monitors these detected inputs (e.g., temperate of motor (or any other part of the valve), current, voltage, power, frequency, travel distance of the actuator, position of the actuator, etc.) for any abnormalities and takes the appropriate corrective action in case of an abnormality (discussed herein).

Figure 9:
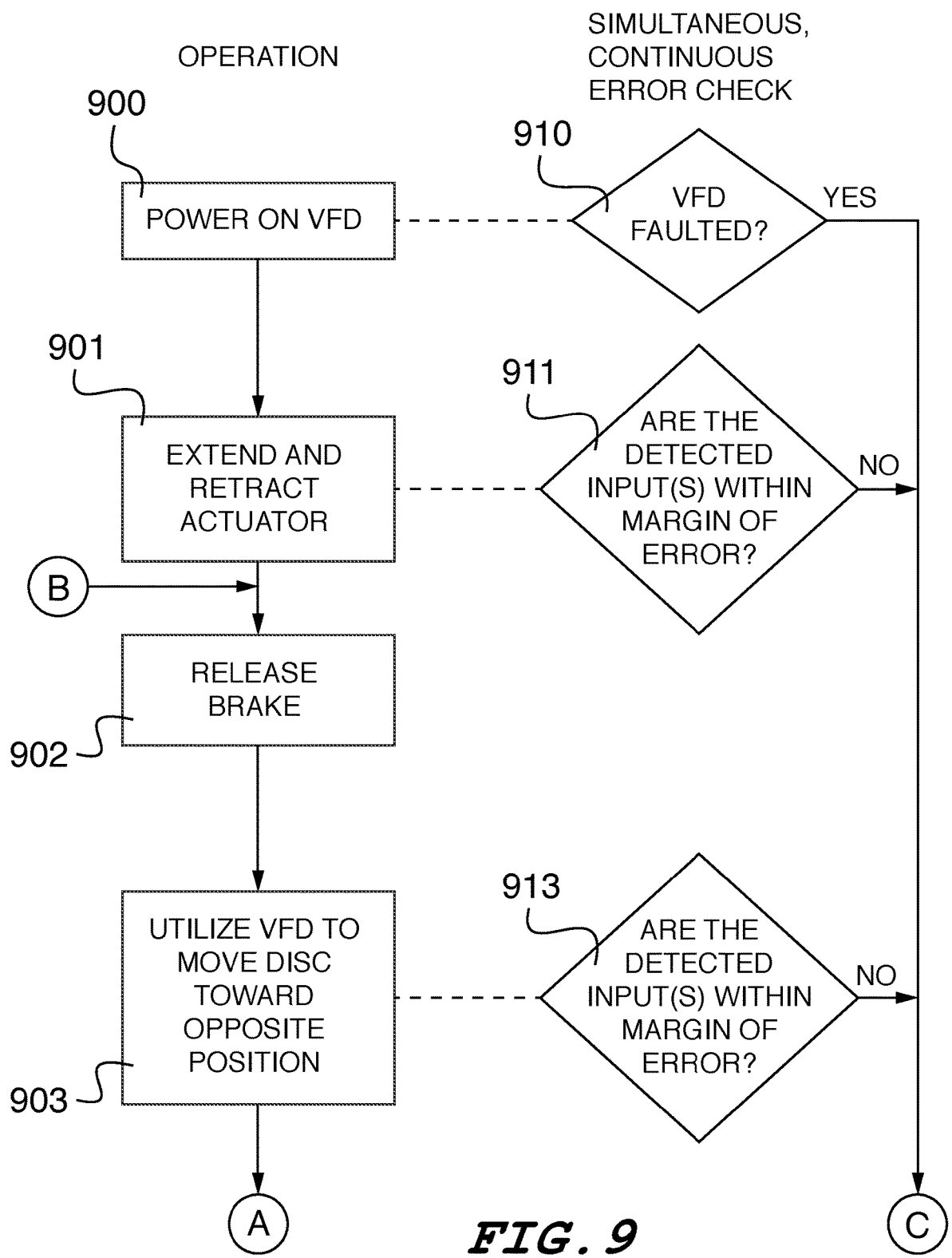
FIG. 9 is a flowchart illustrating an exemplary operation for operating one or more electronic valves, according to an embodiment.
Figure 10:
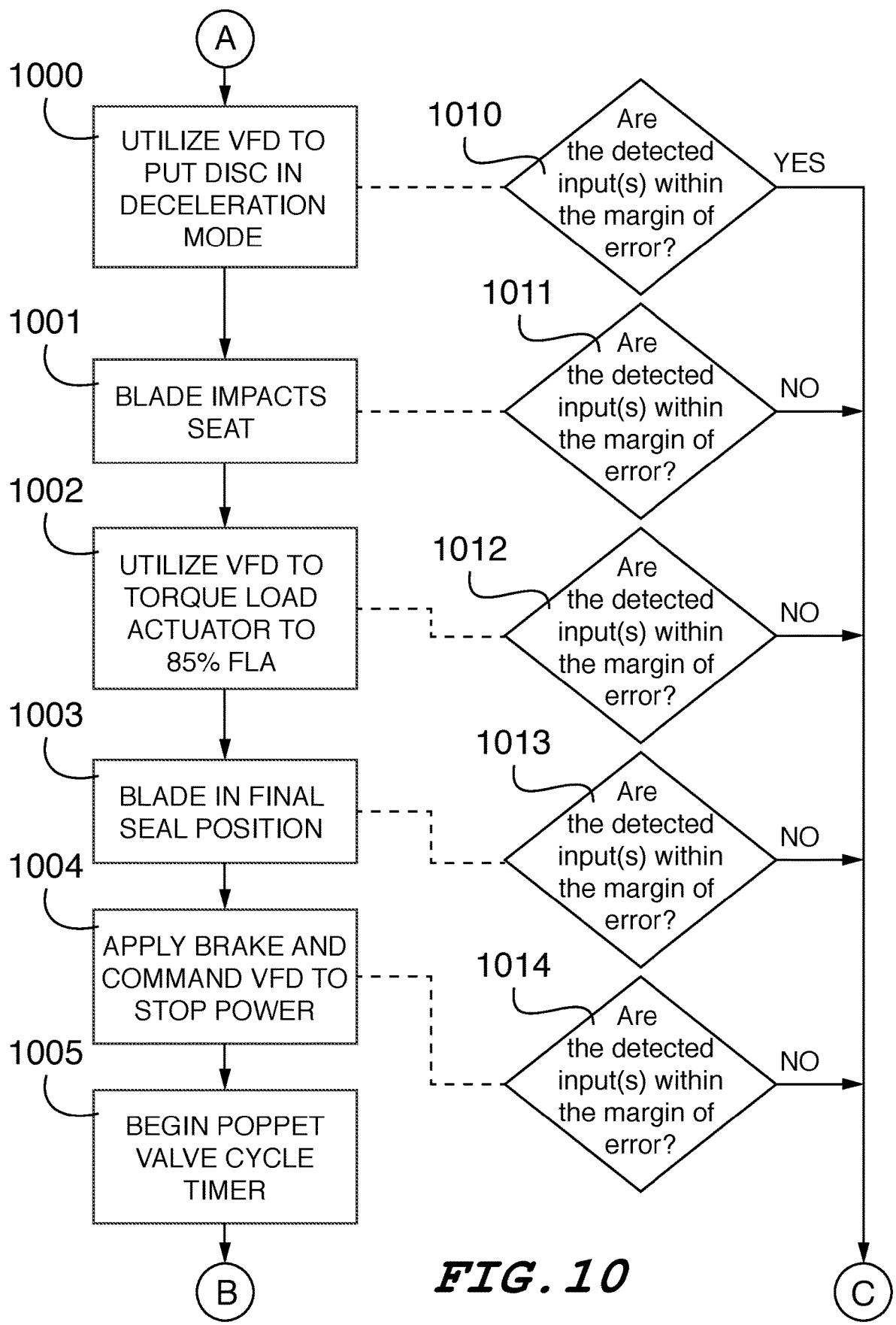
FIG. 10 is a further flowchart illustrating an exemplary operation for operating one or more electronic valves, according to an embodiment.

FIG. 9 is a flowchart illustrating an exemplary operation for operating one or more electronic valves, according to an embodiment. Note that FIGS. 9 and 10 are directed to a single valve, that is, to operate a pair of valves in an RTO, each valve would be executing this method separately (but the valves would cooperate so that they would change position approximately at the same time).

Note that in FIGS. 9 (and 10), there is error checking queries which are being performed simultaneously (and continuously) to the operations involving the valve. The second column in FIGS. 9 and 10 represent error checking queries which are performed continuously (not merely once or at discrete points in the flowchart) while the operation to its left is being performed. Note that in all of the error checking query, if the answer is "NO" then the method proceeds to connector C, which can be handled as shown/described in either FIG. 11 or FIG. 12 based on the embodiment.

In operation 900, the VFD is powered on. The VFD would have its own boot procedure, initialization, operating system, etc.

In decision 910, it is determined whether the VFD is faulted. The VFD would have its own error checking procedures, making sure that all signals are intact, the boot up is proper, etc. If there are any faults (errors) with the powering on of the VFD then the method would proceed to connector C (see FIGS. 11-12). Note that connector C in FIG. 9 and FIG. 10 are the same. Note that if FIG. 12 is being implemented (instead of FIG. 11, that is the embodiment includes the auto-correction), then from connector C the method would automatically proceed to operation 1204 (skipping the autocorrection operations since the valve had not yet begun operation).

From operation 900, the method proceeds to operation 901, which extends and retracts the actuator (using the VFD). This is an initialization test in order to determine whether the system is operating correctly. The VFD executes a program which will send particular voltages and frequencies which will extend the actuator (cause it to move in a first direction). In order to command the actuator to retract (move in a second direction opposite the first direction), the VFD would use a voltage with a sign opposite that which caused the actuator to move in the first direction. In this way, the servomotor which operates the actuator (which is what the voltages from the VFD are actually controlling) can be controlled to rotate clockwise and counterclockwise. Operation 901 (along with its respective error checking query in operation 911) is basically an error checking operation upon initialization (start-up) of the entire system to ensure the valve is operating properly.

Operation 911 occurs simultaneously and continuously with operation 901. In other words, while the VFD is causing the actuator to move (by powering the actuator's servomotor), the travel distance and VFD amperage are being monitored and checked to ensure they are both correct. The travel distance is the change in position of the actuator (and hence the drive shaft and hence the blade). The VFD transmits discrete and pre-programmed voltages and frequencies to the actuator. The travel distance is easily computed by monitoring the signal from the respective sensor for the particular valve which can be used to compute the exact position of the actuator (as described herein). This is generally a deterministic system. That is, given the detected inputs to the system (current position of the actuator, voltages and frequency sent to the actuator by the VFD, time elapsed, temperature, etc.), the movement and position of the actuator, motor, etc., can be calculated. So as the actuator is being extended in operation 901, the error check in operation 911 is continuously being performed to verify that the position of the actuator is always where it is supposed to be. Similarly, as the actuator is being retracted in operation 901, the position of the actuator is continuously being monitored to ensure that it is in its proper position as it is being moved by the VFD. If the actual position of the actuator is not what it is supposed to be, then the method proceeds to connector C (which is the error handling). The amperage coming out of the VFD is also monitored by the control computer and the proper amperage can be computed in numerous ways (such as based on the travel distance). If the amperage from the VFD is not proper this would also trigger a fault and initiate connector C. Thus, the error check in operation 911 isn't a discrete event but is being performed numerous times (e.g., 2 to 100 times a second or more) while its corresponding operation 901 is being performed. The error checking could identify a problem with the valve. For example, if the blade (and its drive shaft) is stuck then it would not move even though sufficient voltage is being applied by the VFD to move it, or the blade could be moving slower than it should be. Whenever any such anomaly is detected (in some or all of the detected inputs), then the error checking query/operation would initiate connector C.

Note that in operation 911, the system (e.g., control computer 800 and/or the VFD) knows what the values for the detected inputs should be based on a real time dynamic value (e.g., current time in cycle, distance traveled of actuator or motor, etc.) For example, a cycle (which is continuously repeated) should have the motor having travelled 5 clockwise rotations at 5 seconds elapsed after the cycle has begun. There are many parameters (e.g., inputs from the VFD) that the system knows what values they should be (e.g., current, voltage, frequency, distance, temperature, etc.) at a particular time in the cycle (or distance, etc.) The system can be programmed to store what the proper values for the detected inputs should be (e.g., over time, distance, etc.) and/or they can be computed in real time based on the values of other parameters. For example, if the system know the current power being output to the motor and how long such power has been applied, then the system can compute what the current speed of the motor should be (based on simple formulas). There can be a margin of error for the detected inputs (e.g., 1%, 5%, etc.) as minor fluctuations in values can be common and can be due to physical imperfections in the equipment such as accumulation of dirt in the motor (which can cause more friction on the motor slowing it down), increased gas pressure inside the valve itself (due to a variable amount of gasses being passed through the valve), etc. In the error checking operations (e.g., 911, 913, 1010, 1011, 1012, 1013, 1014), determines that some or all the detected inputs are within the (programmed) margin of error, then it concludes that there is no fault (error) and operation continues normally. If these operations determine that at least one detected input is outside of its margin of error, then it is considered an error (fault) and then the method proceeds to connector C which addresses the error handling.

Operation 911 is an error checking query and is identical to operations 913, 1010, 1011, 1012, 1013, and 1014. These error checking queries are performed simultaneously and continuously (multiple times) while their respective operations (on the left of the error checking operation) is being performed. Note that these operations can also include any other additional error checks that can be performed, e.g., checking temperature, power, load, etc. If any of these detected/input values fall outside of a predetermined acceptable range, or falls outside of a range computed for a particular situation (e.g., where the current position of the actuator should be, within a 0.1 inch margin of error), then a fault (error) is generated and the method can proceed to connector C (which addresses when an error/fault occurs). In addition, for each error check, if the answer is no then it goes to connector C but if the answer is yes (the values are correct or within an acceptable margin of error) then no error/fault is generated and the performance of the method continues normally.

From operation 901, the method proceeds to operation 902, which releases the brake. This refers to the physical brake which would grab onto the shaft of the motor (or other physical location which can physically restrain motion of the actuator). It may be that coming to operation 902 the brake is not currently engaged (activated), and if this is the case then there is no need to release the brake.

From operation 902, the method proceeds to operation 903, which utilizes the VFD to move the disc toward the opposite position it is currently in. The disc (blade) can be in one of two resting positions (seals), either sealed against the first seat of the valve or sealed against the second seat of the valve. In operation 903, the VFD will be controlled to move the actuator in a direction so that the blade would start to travel away from the current position the blade is currently in. In other words, if the blade is currently in a first position (sealed against the first seat) then the blade would be moved towards a second position, and if the blade is currently in the second position (sealed against the second seat) the blade would be moved towards the first position. Note that if operation 903 is being executed for the first time after initialization of the system (coming from operation 901), then the blade may not be in a full sealing position (not actually in the first position or the second position) but nevertheless the VFD would instruct the actuator to begin moving toward a position.

While operation 903 is being performed, the error checking in operation 913 is continuously being performed (as described herein). For example, as the actuator starts moving from a stationary position and increases in speed, the amperage coming from the VFD should be increasing. Any detected anomaly in the amperage from the VFD and/or the actuator travel distance (position) would generate a fault and cause the method to proceed to connector C (error/fault handling).

The motion in operation 903 continues until the blade gets close in proximity to (but does not contact) the seat (the blade is heading towards). In other words, once the blade is at a pre-programmed distance (e.g., 0.25 inches or other amount) from its destination seat, then the method would proceed to the next operation (1000).

From operation 903, the method proceeds to connector A which continued to FIG. 10 which proceeds to operation 1000.

FIG. 10 is a further flowchart illustrating an exemplary operation for operating one or more electronic valves, according to an embodiment.

In operation 1000, the VFD is utilized to put the disc in deceleration mode. That is, the blade continues to move towards the seat but slows down (e.g., the movement of actuator slows down which is what moves the blade). The reason for the deceleration is that if the blade impacts (contacts) the seat with a large force this would (over time) cause wear and trauma on the equipment and reduce is longevity. Thus, it is desirable to reduce the impact force between the blade and the seat. This is accomplished by decelerating the motion of the blade. The deceleration is accomplished by the VFD reducing the volts and hertz (frequency) to the actuator. For example, before deceleration, the voltage to the actuator can be 480 volts and the frequency can be 60 hertz, and then this can be reduced to 300 volts and 45 hertz, which would cause the servo motor to then operate as a generator using the kinetic energy from the spinning servomotor which generates electricity which gets put back on the DC bus to the VFD (for example via the DC buss). The torque load on the actuator could be, for example, 8 amps just before the deceleration mode and then can go down to 0.1 amp in deceleration mode. Thus, in other words, in the deceleration mode in operation 1000, the actuator (and more technically the servomotor driving the actuator) becomes a generator due to the kinetic energy of the servomotor that is already spinning which transmits electricity back to the VFD.

From operation 1000, the method proceeds to operation 1001, wherein the blade impacts the seat. Note that due to the deceleration in operation 1000, the speed of the impact should be reduced to mitigate the trauma on the system. At the point the blade impacts the seat, the blade would be vertically oriented (see for example, FIG. 4A and FIG. 4B).

From operation 1001, the method proceeds to operation 1002, wherein the VFD is utilized to torque load the actuator to 85% FLA (full load amperage). This is now considered the compression mode. Now that the blade and the seat have made contact, high power is now applied to the actuator in order to generate enough force to create a tight seal between the blade and the seat (the respective seat the blade is contacting). The amperage will now go up very quickly (e.g., can for example, go up to 10 amps). This is so that the blade can compress enough to reach a sealed (airtight) position which requires a lot of power. Once the full load amperage (FLA) is applied (e.g., 85%), then after a brief predetermined period of time (e.g., 2 milliseconds, or other amount such as 1 to 10 milliseconds, or 1 millisecond to 1 second, etc.) then the method proceeds to operation 1004 which applies the brake and commands the VFD to stop powering the actuator. The brief period of time the system waits after applying the brake is because applying the brake at the same time the motor is turned off could cause issues. In other words, When the VFD reaches a percentage (e.g., 80%, 85%, etc.) FLA during compression the control computer detects this and turns on an output to engage the external brake that grabs the servomotor shaft to stop rotation. This electro-mechanical brake takes a few milliseconds to engage so a small delay is incurred before the control computer controls the VFD to stop sending power to the servomotor.

From operation 1002, the method proceeds to operation 1003, in which the blade is now in the final seal position (seated). For example, see FIGS. 4C and 4D. In the seal (or sealed) position, the blade is now compressed (cupped) in direction such that it is pointed towards the seat it is sealed against. The seal position is the final resting position of the blade in which the blade cannot move towards the seat it is contacting (sealed against) any further. Normally the blade is flat but it would be cupped when making contact with the seat. Note that operation 1003 is just a "state", in other words in active performance of the method, operation 1004 would be performed after operation 1002 and operation 1003 is just an occurring "state" of the current apparatus. Alternatively, in an alternate embodiment it may be possible that the blade becomes in the final seal position during operation 1004 (in other words due to kinetic energy the brake can be applied yet the final seal position is still realized after the brake is applied).

From operation 1003, the method proceeds to operation 1004, which applies the physical (external) brake and then commands the VFD to stop power to the actuator. The brake will cause the actuator to remain in its current position and as such there is no need to provide any further power to the actuator at this time. This is yet another advantage of the inventive concept described herein that is, as opposed to a pneumatic system which would need to maintain air pressure (consuming energy) while the valve is seated, the electric system described herein requires little energy while the while the valve is seated.

Note that in error check 1014, now that the physical brake is on, the position of the actuator is monitored to ensure that the actuator is and remains stationary otherwise a fault would be generated.

From operation 1004, the method proceeds to operation 1005, which begins the poppet valve cycle timer. At this time the valve remains seated and stationary and waits a predetermined period of time (e.g., two minutes or other amount) before proceeding to connector B which returns to operation 902 which beings the process all over again (but in the reverse direction).

Note that each valve in the pair of valves operating at the RTO would be working cooperatively but independently. Thus, when the first valve proceeds to operation 902 to move its blade into the opposite direction, the second valve also should simultaneously proceed to operation 902. In other words, both valves would remain seated (in a first sealed position or a second sealed position) at the same time (for a majority of time) but when it is time for them to change to the opposite position both valves would change their position simultaneously (and would take the same amount of time to change their position). Note that during the change of position, there is a small amount of time where both valves are between positions and thus there would typically be a slight leakage in both valves at this time. The amount of leakage should ideally be reduced to a minimum by having the time it takes for the valve to change position as fast as possible.

FIG. 11 begins with connector C and follows from FIGS. 9-10 when an error/fault is detected. When connector C is reached, an error (fault) is detected (typically by the control computer 800, although the VFD can also detect an error and communicate this fact to the control computer 800) and hence operation of the entire RTO system should be suspended while the operators investigate what is going on.

Thus, in operation 1100, the valve with the fault can be put into the extended or retracted position (or mid-stroke) depending on how the system designers choose to handle a fault. The valve should remain in this position (immobile) until the system operators correct the issue and restart the RTO. Note that if one valve in the pair of valves operating the RTO is faulted (generates a fault) and its operation is halted, then the other valve should also be halted as well (and put into a particular predefined position). Upon an error being detected, the control computer can interrupt the program being executed on one (or both) VFD's and command the VFDs to implement a new program/operation (for example, put one or both valves into a particular position (e.g., extended, retracted, or mid-stroke) and remain stationary (e.g., put the physical brake on) and then stop operation indefinitely (e.g., until an operator arrives to evaluate the system and restart it). An alarm can also be triggered, which can include an audible sound to alert the operators of the system. In addition, the alarm can automatically contact the operators (e.g., via text message, email, cell phone call, etc.) to alert them of the issue.

FIG. 12 also begins with connector C and follows from FIGS. 9-10 when an error/fault is detected. When connector C is reached, an error (fault) is detected (typically by the control computer 800, although the VFD can also detect an error and communicate this fact to the control computer 800) and hence operation of the entire RTO system should be suspended while the operators investigate what is going on. FIG. 12 is an alternate embodiment to FIG. 11. In FIG. 12, the system will attempt an autocorrection before aborting the RTO operation and sounding the alarm, while the embodiment in FIG. 11 does not attempt any such autocorrection. So in other words, the system using FIG. 11 would have the auto-correct feature turned off, while the system using FIG. 12 would have the auto-correct feature enabled. The operations in FIGS. 11 and 12 would be implemented by the control computer 800.

The method in FIG. 12 can start with operation 1200, which determines whether an autocorrection is even possible. Operation 1200 is reached when one of the detected inputs is outside of its detected range. Such errors can be caused by a plurality of situations, such as a change in physical conditions of the system due to normal operation (e.g., wear and tear), or a physical malfunction (e.g., a broken motor which does not spin). It is desirable to continue operation of the system whenever possible and hence the former situation (changing on operation due to normal wear and tear) could possibly be automatically adjusted for so operation can continue. For example, dirt can accumulate in the motor (driving actuator 802, 812) over time which could increase friction and hence slow down the speed of the motor. Such condition can be adjusted for by varying the parameters sent to the motor (via the VFD) such as increasing its power, so proper operation of the motor and hence the entire system can continue. On the contrary, if the error is generated from a physical malfunction of the system (such as a broken motor which does not spin), then of course this type of error cannot be fixed via parameter changes and the operation of the valve (and RTO) should cease.

In operation 1200, it is determined whether the error (fault) that triggered connector C is correctable by an autocorrection. This can be done by comparing the type of error and values which are not correctable. For example, if the error is far outside a margin of error, then it would not be correctable. For example, a detected input value that is more than 1% (or other amount) off a predicted value would trigger connector C but if the detected input value is more than 5% (or other amount) off the predicted value (or other amount) then the error is too far off to try to attempt an autocorrection and the method can proceed to operation 1204. In addition, some values (or ranges) for detected inputs would be programmed to just immediately proceed to operation 1204. For example, if the measured current from the VFD is zero, then it is clear there is a major malfunction (possibly a blown fuse, short circuit, etc.) and the operation would proceed to operation 1204. However, in operation 1200, if it is determined that the detected error is potentially correctable by auto-correction, then the method would proceed to operation 1201.

Note that some points in the cycle might not be subject to attempting an auto-correction. For example, if the cycle is in a particular mode (e.g., deceleration mode), then (depending on how the system is programmed), an auto-correction may be too risky to attempt (for example, it is important that the impact on the blade and the seat is not too hard and so at a time shortly before impact an abort may be preferable than an auto-correction, but this would be up to the system designers). So in other words, the time/point that the valve is in the cycle when the error is detected could also be used to determine whether an autocorrect would be attempted or not (proceed to operation 1201 or 1204).

In operation 1201, an autocorrection would be attempted. Any detected input (e.g., distance, temperature, current, voltage, power, etc.) can potentially be autocorrected in this manner by adjusting any parameter output by the VFD to the motor/actuator. An autocorrection is an automatic change in the pre-programmed value(s) that the VFD will output to the actuator (servomotor) to attempt to get the valve parts back on track. For example, if the actuator position is short of (smaller) than where it should be, the current output to the motor on the actuator can be increased. Table I below illustrates an example set of faulted detected inputs and possible automatic corrective action that can be taken automatically in operation 1201 without interruption of the current operation of the valves and RTO. Note that in Table I, c1, c2, etc. are constants. The corrective actions in Table I are merely examples and one skilled in the art could program the control computer 800 to take other appropriate corrective action as well. The corrective actions comprise automatically correcting one or more of the values that the VFD was programmed to output to the motor/actuator so that the VFD now outputs an adjusted value based on the correction.

TABLE I

| Input Deviation | Corrective Action |
| --- | --- |
| Final position of actuator too low by x % | CC adjust VFD/encoder endpoint |
| Final position of actuator too high by x % | CC adjust VFD/encoder endpoint |
| VFD travel Current too high | Decrease freq. by c1% and voltage by c2% |
| VFD travel Current too low | Increase freq. by c1% and voltage by c2% |
| Encoder shows shaft creep after brake applied | Engage VFD and servo motor to hold position |
| Motor temperature too high | Reduce allowable Full Load Amps |
| Speed of travel faster in one direction then other | Adjust Volts/Amps ratio in one direction to equalize travel speed |

In Table I, encoder endpoint refers to the programmed distance in each direction where the VFD current feedback to the control computer tells it that the disc has reached the maximum current during compression but the encoder feedback says that the shaft has not traveled the normal counts is usually sees for that distance. This could be due to thermal expansion/contraction of the shaft and disc blade. Travel current is the power the VFD puts out during movement after accelerating the disc with a spike in current but before the disc begins the deceleration phase (for example, acceleration current can be 4 amps, travel current can 0.5 amps, deceleration current is −3 amps and then compression current can be 8 amps).

With regard to the input deviation of, "encoder shows shaft creep after brake applied", if the brake is applied and during the poppet cycle time (operation 1005), the encoder feedback shows counts indicating that the brake is not holding and the disc is slowly un-springing, then an auto correction operation can re-utilize the VFD and have it hold the disc in compression. This might be caused by a defective brake or fault control computer output. So the VFD can be re-engaged to power the servomotor to keep the disc in compression. One downside is that the motor will begin heating up, as it heats up in the long term the current draw will increase or if the VFD reaches current limit then the encoder will show more counts backwards, showing more creep.

There can be a tolerance, but it can vary depending on the valve size and system airflow pressures. Normally during commissioning an operator can establish the actual setpoints and expected deviation limits for corrective action and separate deviation limits and actions for faults. The possible corrective action would be dependent on the nature of the deviation. For example, an abnormally high current during the travel portion might be indicative of some system device wear, and a resultant message to operators can be transmitted to check lubrication, check operational temperatures in the affected area, reduce the speed slightly by lowering the commanded frequency (hertz) and voltage. An abnormally low current during travel or during the compression cycle might indicate that a mechanical coupling may have unscrewed. This would give a deviation error in travel distance versus expected current, and it would be low current and high travel on one direction and then high current and low travel in the other direction.

Thus, an error-correction routine would automatically adjust some of the parameters that the VFD would output to the system (e.g., the motor controlling the actuator) in order to get the valve back on track. After a predetermined period of time of using the adjusted parameters (e.g., 0.1 seconds to 2 seconds), the method would proceed to operation 1202. Note that the adjusted parameters could continuously adjusted based on the VFD programming. For example, if autocorrect determines to increase the voltage that is sent from the VFD to the motor, and the VFD programming is increasing this voltage over time, then the increasing voltage programmed by the VFD would also be increased by the auto-correct such that the auto-correct would serve to amplify the voltage (or other parameter) already being output. For example, the autocorrect operation could amplify the voltage (or current, etc.) output by the VFD by 2%, −2%, (or other amount).

Table II below illustrates one example of an auto-correction routine (written in "pseudocode") which uses a feedback loop (values of faulted inputs to determine the correction). In Table II, the fault is: low current feedback during extension of poppet shaft when at point that PLC/VFD & encoder feedback anticipates touching seat AND high current during retraction of poppet shaft when at point that PLC/VFD & encoder feedback anticipates reaching opposite seat. In order to automatically correct this fault, the control computer changes encoder count point (on the VFD), adding 5 counts to extend and subtracting 5 counts from retract targets, while checking that current feedback increases on extend and drops on retract. If so and current falls within normal bandwidth then end auto correct. If not, then the control computer adds/subtracts 10 counts to extend/retract encoder count to VFD while checking that current feedback increases on extend and drops on retract. If so and current falls within normal bandwidth then end auto correct. If current remains outside of normal bandwidth then abort RTO operation and begin RTO cooldown as poppet blade has become distorted. Before implementing the method in Table II, an initialization routine should be run to initialize values (e.g., x=0).

TABLE II

A) If register X =0 AND If A(extend)@ [encoder_count_#_extend] < A(target_A_@_extend_a) AND If A (retract)@ [encoder_count_#_retract] >A(target_A_@_retract_a) Then add 5 counts to [encoder_count_#_extend] And subtract 5 counts from [encoder_count_#_retract] and put 1 in register X
B) If register X =1 AND If A(extend)@ [encoder_count_#_extend] < A(target_A_@_extend_a) AND If A (retract)@ [encoder_count_#_retract] >A(target_A_@_retract_a) Then add 10 counts to [encoder_count_#_extend] And subtract 10 counts from [encoder_count_#_retract] and put 2 in register X TABLE II-continued C) If register X =2 OR If A(extend)@
[encoder_count_#_extend] =
A(target_A_@_extend_a) AND A(retract)@
[encoder_count_#_retract] >A(target_A_
@_retract_a) Then abort RTO operation
D) If register X =2 OR If A(extend)@
[encoder_count_#_extend] >
A(target_A_@_extend_a) AND A(retract)@
[encoder_count_# retract]=A(target_A_@_
retract_a) Then abort RTO operation
E) If register X =2 AND A(extend)@
[encoder_count_#_extend] =
A(target_A_@_extend_a) AND A(retract)@
[encoder_count_#_retract]=A(target_A_@_
retract_a) Then put 0 in register X and
continue RTO operation Table III below specifies the variables used for Table II.

TABLE III

A = amps.
A(extend)@ [encoder_count_#_extend] =
A=amps, encoder_count_#_extend is the
encoder count at the position of the servomotor
[shaft] where we expect to touch the seat on extending.
At this point the amperage should rise significantly
A(target_A_@_extend_a) = a predefined expected
current (which will rise) when the blade is compressed
when it is being fully extended (it would begin
comparing expected amperage at encoder (distance)
points and if within bandwidth for those point then it
would do nothing. So depending on the format of the
encoder feedback once the expected encoder point is
reached a % amperage per encoder count would be used).
A(retract)@ [encoder_count_#_retract] = A=amps,
this is the encoder count of the position of the
servomotor [shaft] where it is expected to touch
the seat on retracting. At this point the amperage
should rise significantly.
A(target_A_@_retract_a) = A=amps, this is the expected
amp value as the disc touches the seat and the motor
continues to push, increasing the blade compression.
encoder_count_@_extend = the expected position where
the disc touches the seat on the extended cycle.
encoder_count_@_retract = the expected position where
the disc touches the seat on the retract cycle.

Thus, the code in Table II is a routine that sees a deviation in current at a specific travel/contact point. This deviation could be from thermal expansion of the shaft because of a significant change in temperature where the shaft/disc operate. The change could be from start-up to operational temperature or from different process lines. If the deviation is not thermal in nature then the lines C and D from Table II determine that something else is involved. The register X is to detect that something is coming unscrewed, so the offset is similar to thermal, but would continue to occur as it further unscrewed and the deviation kept increasing. An elapsed time can be added between deviations to better filter this.

As such, the auto correct example illustrated in Tables II and III changes the basis for the fault correction. Once the encoder point is reached where the disk should be touching the seat it looks to see if the amperage is rising. The correcting of the encoder expected contact point in this example would be to determine if the amperage deviation is from thermal expansion, which would mean that you would expect to add—subtract the same # of counts. Changing the counts is compensating for the shaft having gotten longer and shifting the expected encoder count position. If the correction only adds or subtracts then there is something mechanically wrong so there is no point in an auto correct. This might be necessary on units with high inlet/outlet temperatures, where the shaft when cool is one length, but upon heating when in operation it would get longer, changing the expected contact point/amperage rise points. Thermocouples could be used in these areas along with coefficients of expansion for materials to calculate the shaft thermal expansion and use this correction factor to shift the expected seat contact points, and then as temperature changes the expected contact points can be autocorrected.

From operation 1201, the method proceeds to operation 1202. Note that the autocorrected parameters in operation 1201 should be given some time (e.g., 0.1 to 2 seconds or other amount) before operation 1202 to give the adjustments some time to see if they correct the issue. In operation 1202, it is determined whether the detected input(s) which previously faulted (which caused connector C to be initiated) are now within the proper margin of error (e.g., 1%) of their predicted (normal) values. If so, then the method proceeds to operation 1202. If not, then the method proceeds to operation 1204.

Note that all adjustments are stored in a computer readable file so that the system operators are alerted to the fault/error and the attempted autocorrection so the system operators can evaluate what happened and what further action should be taken.

In operation 1203, the system continues with the cycle, that is the methods shown in FIGS. 9-10 are continued. In this case, the autocorrection worked and the operation of the faulted valve (and hence RTO) did not have to be suspended. In one embodiment, the values used by the VFD to control the motor/actuator are no longer adjusted and return to their normal programmed values. In another embodiment, the values used by the VFD to control the motor/actuator remain adjusted.

Operation 1204 is the same as operation 1100, that is, operation of the RTO is aborted and an alarm is sounded.

Note that all detects inputs, outputs by the VFD, and any other parameters/values used by the system can all be stored in real time in a computer readable storage medium so that the system operators can review and evaluate all operation of the system.

Figure 13A:
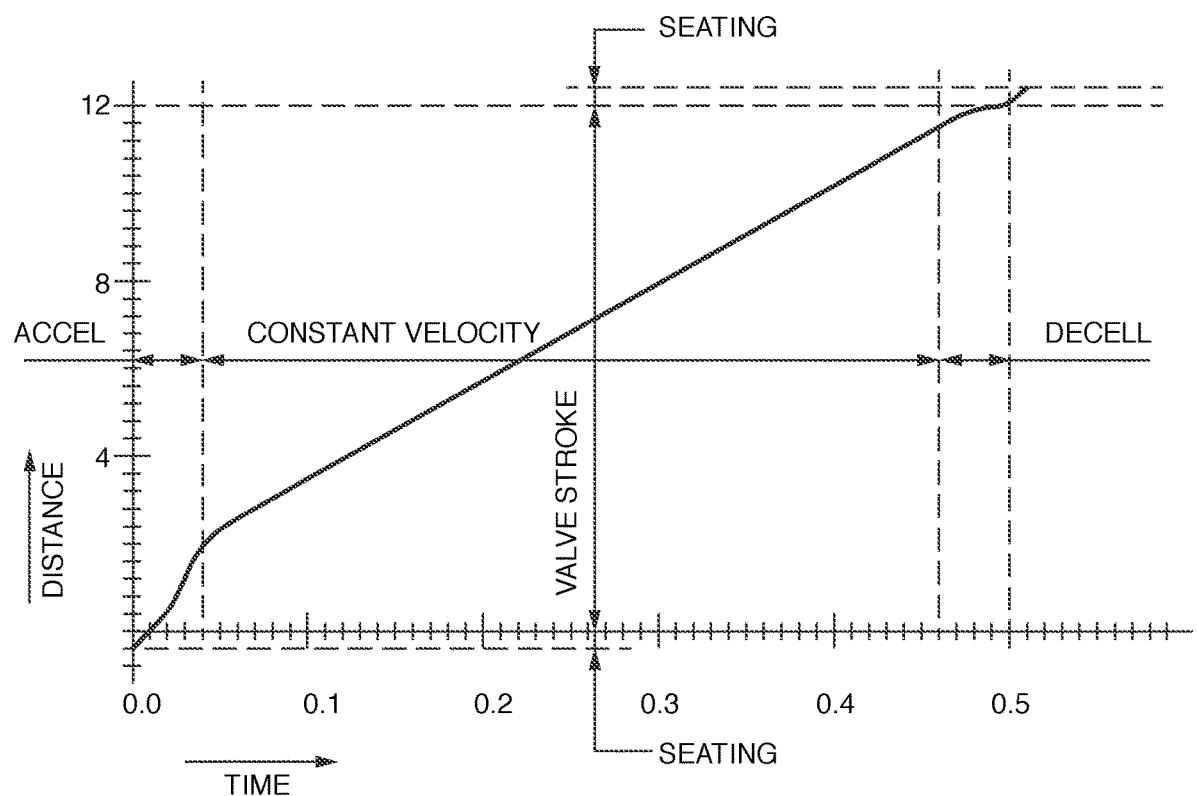
FIG. 13A is a chart showing response behavior of an electronic valve over time, according to an embodiment.
Figure 13B:
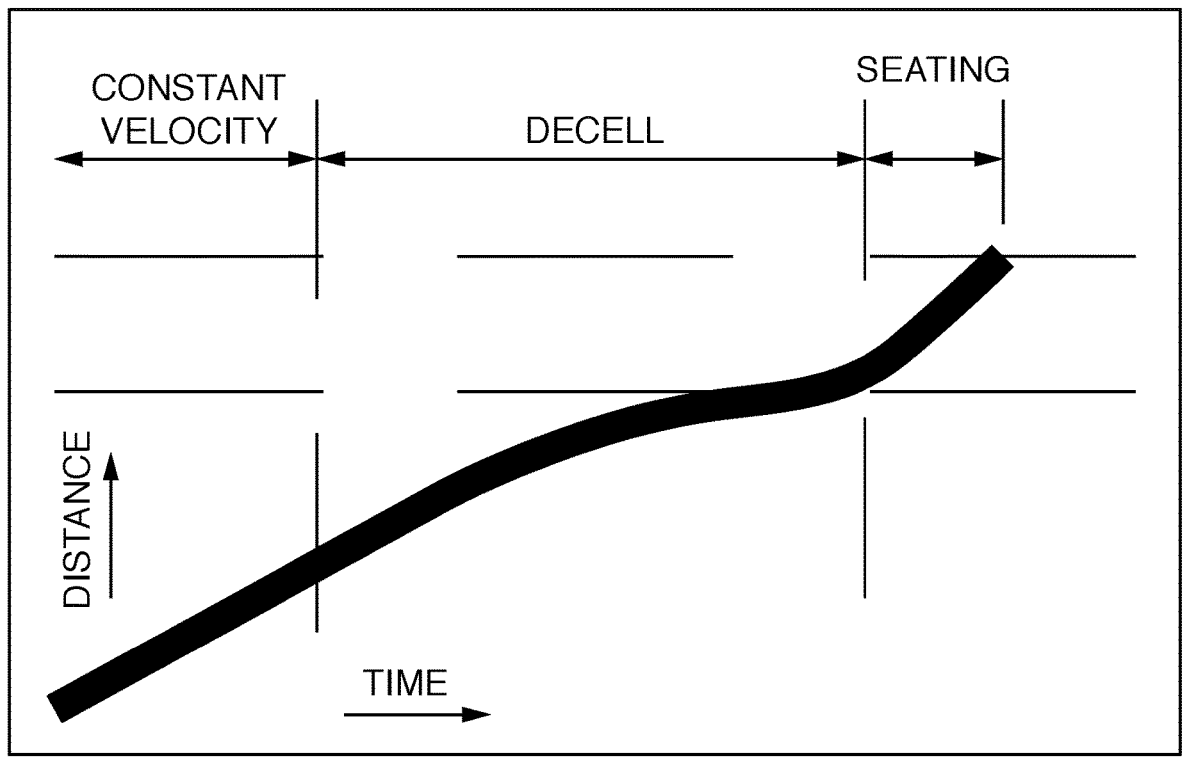
FIG. 13B is an enlarged portion of FIG. 13A.

FIG. 13A is a graph showing response behavior of an electronic valve over time, according to an embodiment. FIG. 13B is an enlarged portion of FIG. 13A;

On the x-axis is time and the y-axis is distance traveled. The negative 0.025 inch distance represents the seated position while the 12.25 inches distance represents the seated position in the opposite direction. It can be seen that once the actuator is initiated to change position, it goes through a period of acceleration (operation 903), then a period of constant velocity (operation 903), then a period of deceleration (operation 1000), then a period of seating (after contact is made, operation 1002).

Figure 14:
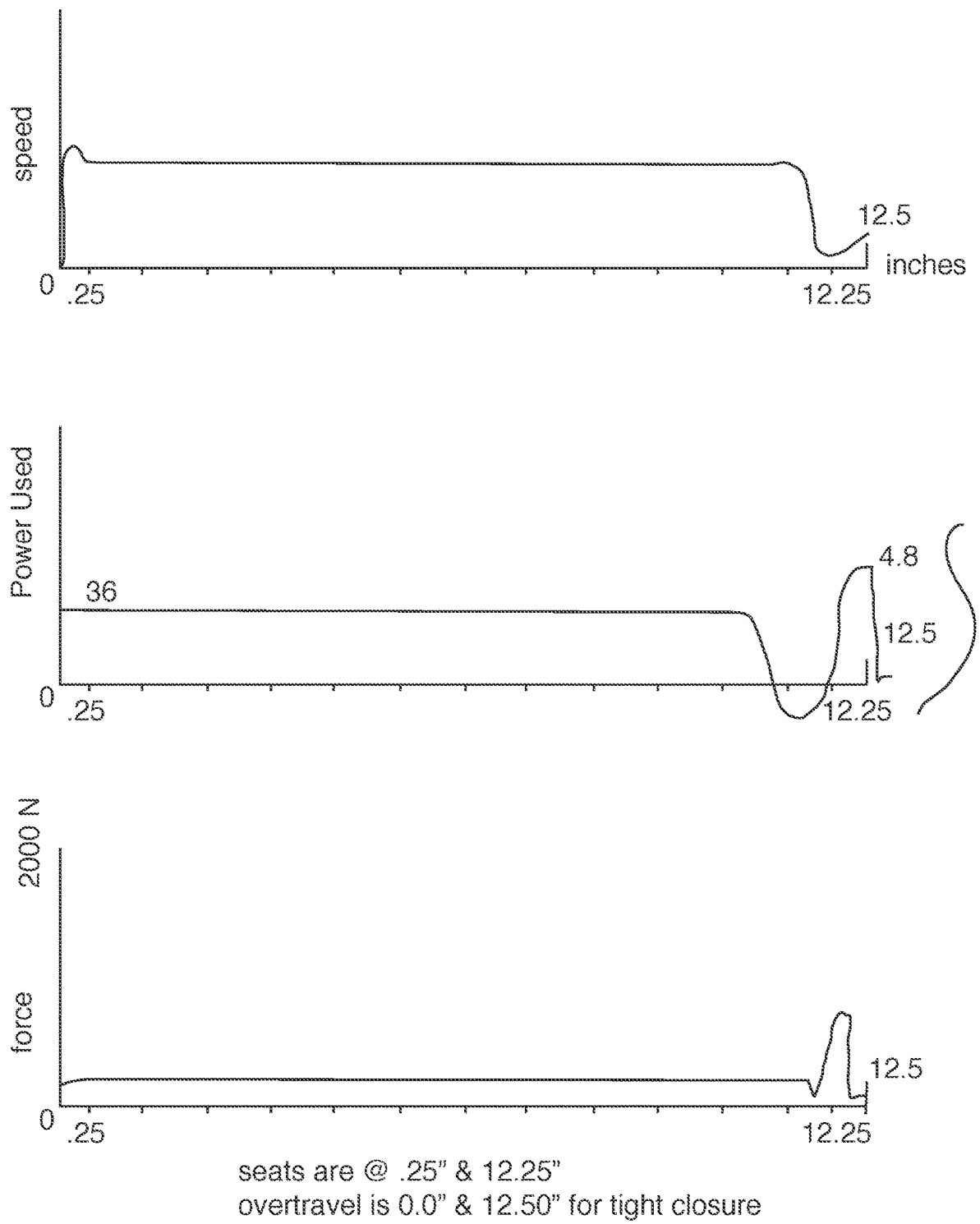
FIG. 14 are further charts showing response behavior of an electronic valve, according to an embodiment.

FIG. 14 are further graphs showing response behavior of an electronic valve, according to an embodiment. These charts can be compared to the charts of FIG. 2 which are for a pneumatic valve. Note that all of the graphs presented in this application are for illustrative purposes but no representation is being made that they are 100% accurate and perfect.

The first graph shows distance vs speed, that is, for each distance the blade is along the path between its sealed positions, what the speed of the blade will be. As can be seen in the first graph, the speed starts off with a spike and then stabilizes and slows down just before the blade impacts the seat, and then it actually speeds up a little and then reaches the full sealed position (12.5 inches) where the movement of the blade stops.

The second graph shows distances vs power used. As can be seen in the graph, the power remains constant until the blade approaches the seat, then the power drops down and even goes below zero which means the servomotor (driving the actuator) is serving as a generator until the power becomes positive again. The power drops because of the deceleration mode (operation 100) in order to reduce the impact force of the blade on the seat and then the power spikes back up (operation 1002, compression mode) to form a tight seal between the blade and the seat and then the power drops once movement of the blade stops and the brake is engaged.

The third graph shows the force on the blade. Note the force on the blade drops immediately before the blade impacts with the seat and then the seat impact increases the force on the seat but quickly drops off. Compare this graph with the third graph in FIG. 2 (for the pneumatic valve) in which the force on the blade is much higher.

Figure 15:
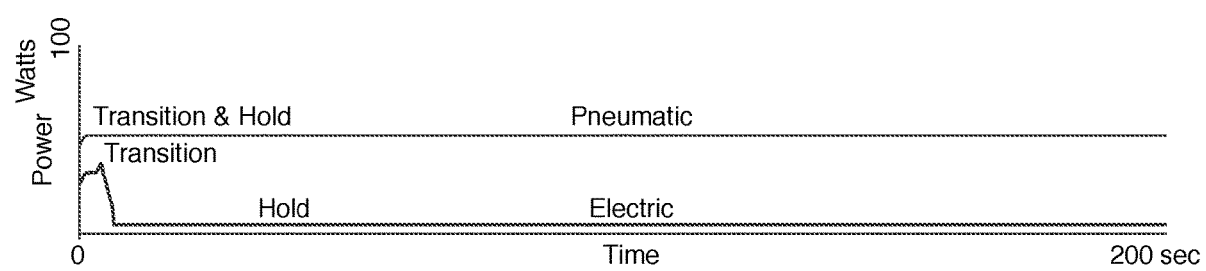
FIG. 15 is a graph comparing the power requirements of maintaining a pneumatic valve vs an electric valve in a holding position, according to an embodiment.

FIG. 15 is a graph comparing the power requirements of maintaining a pneumatic valve vs an electric valve in a holding position, according to an embodiment.

In operation 1005, the valve waits a predetermined period of time before switching positions. The prior art pneumatic valve requires a constant supply of compressed air which requires more power to maintain the valve in a stationary position. In contrast, in the current electric valve, a mechanical brake holds the motor shaft stationary using little power to hold the valve in a stationary position.

As discussed above, the servo motor can serve as a generator when the motor is slowed down (before impacting the seat), thereby sending current back to the VFD. If the slow-down is too extreme, then the amount of power sent back to the VFD DC buss would be so great that it could damage the VFD. Therefore, the slow down of the motor should be restrained in order to prevent an excess of power from overloading the VFD.

A braking resistor assembly can be used in order to extinguish extra power being sent to the VFD from the motor which is being slowed down (and thus operating in a "generator mode").

Figure 16:
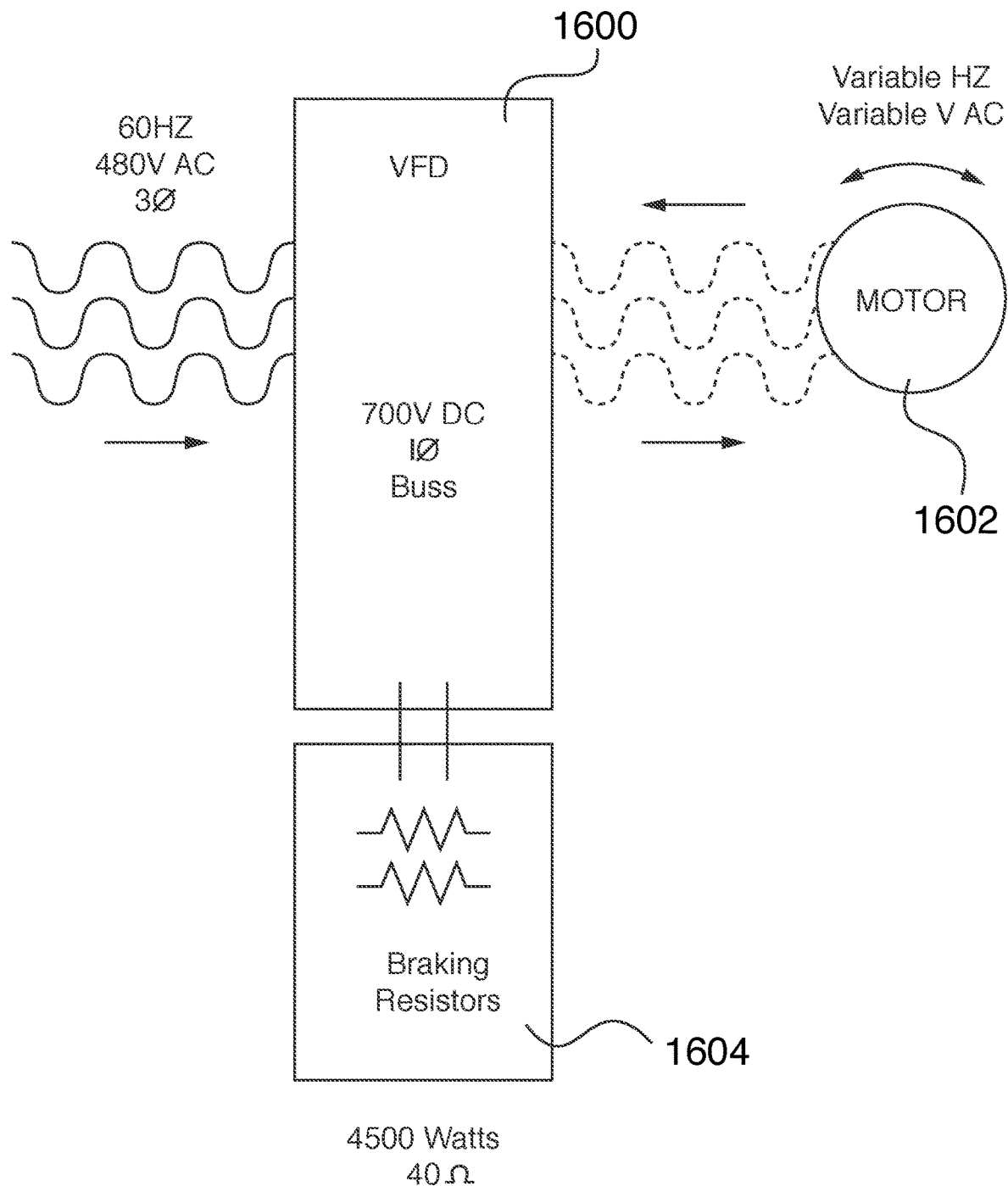
FIG. 16 is a drawing illustrating a braking resistor assembly, according to an embodiment.

FIG. 16 is a drawing illustrating a braking resistor assembly, according to an embodiment.

In this example, AC current (e.g., 60 hz, 3 phase, 480 V) enters the VFD 1600 where it is converted into 700 volts DC single phase power and placed on the VFD drive buss. From there the VFD 1600 re-cuts the power to generate variable frequency variable voltage 3 phase power to turn the electric motor 1602 forward, accelerating the poppet disk and sending it across the seating gap.

As the poppet approaches the other seat the internal encoder recognizes the position and now reduces the voltage and frequency of the electric motor. In this mode the motor 1602 becomes a generator and places the excess power generated (which is then converted to DC) on the VFD DC buss. If the VFD DC buss voltage becomes too high (e.g., over 700 volts) the VFD 1600 will sustain internal damage. To prevent this, a DC buss maximum voltage can be configured and the VFD 1600 will shut down if the DC buss exceeds (or is greater than or equal to) this maximum voltage.

To avoid such a shutdown, the excess voltage is sent to a braking resistor assembly 1604. The braking resistor assembly 1604 takes excess power from the VFD DC buss before the voltage trip level and applies it to the braking resistors inside the braking resistor assembly 1604 in order to dissipate the excess regenerated energy as heat and allows the VFD 1600 to decelerate the poppet disk at a satisfactory speed.

If the voltage on the VFD buss is less than or equal to 700 (or other threshold value) then there is no issue as the VFD buss can handle this voltage. However, if the voltage on the VFD buss is greater than the threshold (e.g., 700 volts), then the voltage in excess of 700 volts is sent to the connected braking resistor assembly 1604 which uses resistors to burn off (dissipate) the excess voltage coming from the VFD buss. This enables the motor 1602 to be slowed down more quickly because it prevents any damage to the VFD 1600 from over-voltage. Note the threshold (the minimum voltage which initiates a transfer of power (greater than the threshold) from the DC VFD buss to the braking resistor assembly 1604) can be set as a parameter by the system operator.

Inside the VFD 1600, a monitoring circuit uses an insulated gate bipolar transistor (IGBT) to detect when the voltage is over the threshold (e.g., 700 volts or other amount). The IGBT transfers any power on the VFD buss in excess of the 700 volts to the braking resistor assembly 1604 so the excess power is burned off (dissipated) as heat by the resistor(s) in the braking resistor assembly 1604. The resistor(s) in the resistor braking assembly 1604 can be, for example, a bank of 40 ohm resistors (or any other suitable resistance). Note that 700 volts as used herein is just one example of a configuration, but other such voltages can be used as well.

Thus, by utilizing the braking resistor assembly 1604, the motor 1602 can be stopped more quickly (than a system without such a braking resistor assembly 1604) because power generated by the slowing motor (in excess of what the VFD 1600 can handle) would be burned off as heat by the resistor(s) in the braker resistor assembly 1604.

While it has been mentioned that the valve (and related features/structures/methods, etc.) described herein can be used in an RTO to direct the gas flow (e.g., can serve as valves A and B as illustrated in FIGS. 1A and 1B (and FIGS. 1C and 1D), it is noted that all embodiments and features described herein are not limited just for use in an RTO but can also be used in any type of application, structure, process, etc., where such valves can be utilized.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An apparatus, comprising:
   a first valve comprising a first actuator, the first actuator connected to a first shaft, the first shaft connected to a first blade, the first valve further comprising a first front seat;
   a first variable frequency drive configured to operate the first actuator;
   a second valve comprising a second actuator, the second actuator connected to a second shaft, the second shaft connected to a second blade, the second valve further comprising a second front seat;
   a second variable frequency drive configured to operate the second actuator;

a control computer configured to control the first variable frequency drive and the second variable frequency drive; and a regenerative thermal oxidizer configured to utilize the first valve and the second valve, wherein the first valve further comprises a first rear seat opposite the first front seat, wherein the second valve further comprises a second rear seat opposite the second front seat, wherein the first variable frequency drive is programmed to move the first blade from contacting the first front seat to contacting the first rear seat, wherein the first variable frequency drive is further programmed to accelerate the first blade from the first front seat towards the first rear seat and then decelerate the first blade before the first blade contacts the first rear seat.

2. The apparatus as recited in claim 1, wherein the control computer is further configured to monitor the first variable frequency drive and the second variable frequency drive and halt operation of both the first actuator and the second actuator upon an error.

3. The apparatus as recited in claim 1, wherein the first variable frequency drive is further programmed such that, after the first blade contacts the first rear seat then increase power to the first actuator.

4. The apparatus as recited in claim 3, wherein the first variable frequency drive is further programmed such that after a predetermined amount of time after the increase of power, power is cut off to the first actuator and a brake is applied to a servomotor driving the first actuator.

5. The apparatus as recited in claim 1, further comprising a first brake controlled by the control computer and configured to restrain motion of the first actuator.

6. The apparatus as recited in claim 1, wherein the first variable frequency drive is configured to apply different predetermined amounts of power to the first actuator.

7. The apparatus as recited in claim 1, wherein the first valve further comprises a sensor configured to transmit position data to the first variable frequency drive.

8. The apparatus as recited in claim 7, wherein the control computer is further configured to receive the position data and determine a position of the first actuator using the position data, and determine whether the first actuator is located in a correct position and generate an error if the first actuator is not located in the correct position.

9. The apparatus as recited in claim 7, wherein the sensor is an encoder.

10. The apparatus as recited in claim 1, wherein the control computer is further configured to detect an error with a detected input from the first variable frequency drive and automatically adjust at least one output to the first actuator compensating for the error.

11. The apparatus as recited in claim 1, further comprising a braking resistor assembly connected to the first variable frequency drive, wherein the first variable frequency drive and the braking resistor assembly are configured to burn off excess power above a threshold in the first variable frequency drive.

12. An apparatus, comprising:
a valve comprising an actuator, the actuator connected to a shaft, the shaft connected to a blade, the valve further comprising a first seat and a second seat opposite the first seat;
a variable frequency drive configured to operate the actuator; wherein the variable frequency drive is programmed to move the blade from contacting the first seat to contacting the second seat, wherein the variable frequency drive is further programmed to accelerate the blade from the first seat toward the second seat and then decelerate the blade before contact is made with the second seat;
a control computer configured to monitor the variable frequency drive; and
wherein the variable frequency drive is further configured to accelerate the blade from the first seat towards the second seat and then decelerate the blade before the blade contacts the second seat.

13. The apparatus as recited in claim 12, wherein the apparatus further comprises a brake configured to physically stop rotation of a servomotor driving the actuator, the control computer further configured to control the brake.

14. The apparatus as recited in claim 13, wherein the control computer is further configured to monitor for errors during operation of the valve and upon condition of an error then engage the brake.

15. The apparatus as recited in claim 12, wherein the valve further comprises an encoder configured to measure rotation of a servomotor which drives the actuator.

16. The apparatus as recited in claim 15, wherein the control computer is further configured to receive position data from the encoder and determine a position of the actuator using the position data, determine whether the actuator is located in a correct position and generate an error if the actuator is not located in the correct position.

17. The apparatus as recited in claim 12, wherein the variable frequency drive is further programmed such that after the blade contacts the second seat then increase power to the actuator.

18. The apparatus as recited in claim 17, wherein the variable frequency drive is further programmed such that after a predetermined amount of time after the increase of power, power is cut off to the actuator and a brake is applied to a servomotor driving the actuator.

19. The apparatus as recited in claim 12, wherein the control computer is further configured to detect an error with a detected input from the variable frequency drive and automatically adjust at least one output from the variable frequency drive to the actuator compensating for the error.

20. The apparatus as recited in claim 19, wherein the control computer is further configured such that the automatically adjusted at least one output is determined based on a formula incorporating a value of the detected input with the error.

21. The apparatus as recited in claim 12, further comprising a servomotor driving the actuator, wherein the variable frequency drive is configured such that the servomotor operates as a generator when the servomotor is slowed down.

22. The apparatus as recited in claim 21, further comprising a braking resistor assembly connected to the variable frequency drive, wherein the variable frequency drive and the braking resistor assembly are configured to burn off excess power above a threshold in the variable frequency drive.

23. A method, comprising:
providing a valve comprising an actuator, the actuator connected to a shaft, the shaft connected to a blade, the valve further comprising a first seat and a second seat opposite the first seat;
providing a variable frequency drive configured to operate the actuator;
providing a control computer configured to monitor the variable frequency drive;

using the variable frequency drive, accelerating the actuator causing the blade to move from a first position contacting the first seat towards the second seat;
using the variable frequency drive, decelerating the actuator before the blade contacts the second seat;
using the variable frequency drive, increasing power to the actuator after the blade contacts the second seat; and
after the blade is in a sealed position against the second seat, applying a brake and cut power to the actuator.

24. The method as recited in claim 23, further comprising: utilizing the valve in a regenerative thermal oxidizer.

25. An apparatus, comprising:
a first valve comprising a first actuator, the first actuator connected to a first shaft, the first shaft connected to a first blade, the first valve further comprising a first front seat;
a first variable frequency drive configured to operate the first actuator, wherein the first variable frequency drive is further configured to accelerate the first blade from the first front seat towards a first rear seat and then decelerate the first blade before the first blade contacts the first rear seat;
a second valve comprising a second actuator, the second actuator connected to a second shaft, the second shaft connected to a second blade, the second valve further comprising a second front seat;
a second variable frequency drive configured to operate the second actuator;
a control computer configured to control the first variable frequency drive and the second variable frequency drive;
a first chamber and a second chamber; a combustion chamber between the first chamber and the second chamber;
wherein the control computer is configured to control the first valve and the second valve to periodically alternate positions between a first flow in which process gas enters an intake and flows from the first chamber through the combustion chamber through the second chamber and out an exhaust, and a second flow in which process gas enters the intake and flows from the second chamber through the combustion chamber through the first chamber and out the exhaust.

26. The apparatus as recited in claim 25, wherein the first chamber, the combustion chamber, and the second chamber are all part of a regenerative thermal oxidizer configured to clean contaminated air.

\* \* \* \* \*